(12) United States Patent
Sasaki

(10) Patent No.: US 6,345,679 B1
(45) Date of Patent: Feb. 12, 2002

(54) VEHICLE HOOD APPARATUS

(75) Inventor: Sakae Sasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/619,323

(22) Filed: Jul. 19, 2000

(30) Foreign Application Priority Data

Jul. 19, 1999 (JP) .......................................... 11-204929

(51) Int. Cl.$^7$ .............................................. B60K 28/10
(52) U.S. Cl. ....................... 180/274; 180/271; 296/189; 296/194
(58) Field of Search ................................ 180/271, 274, 180/281; 296/194, 189

(56) References Cited

U.S. PATENT DOCUMENTS

| | | | |
|---|---|---|---|
| 3,709,316 A | 1/1973 | Glance | |
| 4,249,632 A | 2/1981 | Lucchini et al. | |
| 4,572,314 A | 2/1986 | Anguera | |
| 4,753,475 A | 6/1988 | Mochida | |
| 5,197,560 A | * 3/1993 | Oda et al. ................. | 180/69.21 |
| 5,337,852 A | * 8/1994 | Kastner ...................... | 180/274 |
| 6,182,782 B1 | * 2/2001 | Matsuura et al. ........... | 180/274 |
| 6,217,108 B1 | * 4/2001 | Sasaki ........................ | 296/194 |

FOREIGN PATENT DOCUMENTS

| | | |
|---|---|---|
| DE | 2711338 | 9/1978 |
| DE | 2757238 | 6/1979 |
| DE | 2841092 | 4/1980 |
| DE | 2841315 | 10/1980 |
| DE | 2947202 | 5/1981 |
| DE | 19721565 | 4/1997 |
| DE | 19712961 | 1/1998 |
| DE | 19922454 | 11/2000 |
| JP | 9-315266 | 5/1996 |
| JP | 10-258774 | 3/1997 |
| JP | 11-34925 | 7/1997 |
| JP | 09315266 | 12/1997 |
| JP | 11034925 | 2/1999 |

OTHER PUBLICATIONS

Specification of application No.: 09/611,249—Patented 6217108.
09/619,323:Translation of German Search Report, and German Search Report, 8 pages, Feb. 13, 2001.
09/613,125:Translation of German Search Report, and German Search Report, Feb. 13, 2001.

* cited by examiner

*Primary Examiner*—Paul N. Dickson
*Assistant Examiner*—Deanna Draper
(74) *Attorney, Agent, or Firm*—Merchant & Gould P.C.

(57) ABSTRACT

A vehicle hood apparatus includes a hood holding mechanism which, when a vehicle collides with an obstacle, lifts up by a predetermined amount the rear end portion of a hood and holds the position of the lifted-up rear end portion. The hood holding mechanism includes a bendable link which bends or stretches according to the up or down movement of the hood, and an auxiliary link which prevents the bendable link from moving toward the rear of the vehicle. The auxiliary link mechanism restricts the movement of the bendable link toward the rear of the vehicle, thereby preventing the hood from being deformed and moving toward the rear of the vehicle.

3 Claims, 24 Drawing Sheets

VEHICLE HOOD APPARATUS

BACKGROUND OF THE INVENTION

1. Field of the Invention

The present invention relates to a vehicle hood apparatus which protects an obstacle when a running vehicle collides with the obstacle, by reducing a shock to be given to the obstacle when the obstacle hit by the vehicle strikes on a hood and undergoes a secondary collision with the vehicle.

2. Description of the Related Art

When a running vehicle collides with an obstacle, the obstacle in many cases collides with the bumper of the vehicle and then strikes on the hood of the vehicle and undergoes a secondary collision with the top surface of the hood. At this time, the obstacle receives the shock of the collision from the A known apparatus which reduces such a shock is, for example, the vehicle hood apparatus disclosed in Japanese Patent Laid-Open Publication No. HEI-11-34925. During collision of a vehicle, the vehicle hood apparatus lifts up the rear end of its hood and forms a predetermined space between the hood and its engine room to allow the hood to be deformed downwardly, thereby absorbing collision energy.

When the vehicle collides with an obstacle, the vehicle hood apparatus detects the collision through a collision detecting sensor provided on a front bumper. On the basis of the detection signal, the vehicle hood apparatus inflates the air bag of an actuator. The rear end of the hood is lifted up by a predetermined amount by the inflation of the air bag. The position of the up-lifted hood is held by a hinge mechanism.

The hinge mechanism includes a vehicle-body-side link (equivalent to a bracket) bolted to the vehicle body. A slide hole which extends toward the front and the rear of the vehicle is formed in the vehicle-body-side link. A slide pin is slidably fitted in the slide hole. One end of an intermediate link is pivotally secured to the slide pin. One end side of a hood-side link is secured to the rear end of the hood. The other end of the intermediate link and the other end of the hood-side link are rotatably connected to each other by a connecting pin.

A connecting member made of wire is interposed between the vehicle body and the connecting pin. One end of the connecting member is secured to the vehicle body, and the other end is secured to the connecting pin. When the rear end of the hood is lifted up, the connecting member is brought to a tense state, whereby the movement of the connecting pin toward the rear of the vehicle is restricted. Accordingly, the rear end of the hood is prevented from approaching a windshield more closely than necessary.

However, although the above-described vehicle hood apparatus is art which merely restricts the movement of the rear end of the hood toward the rear of the vehicle, the vehicle hood apparatus needs a large number of components and a complicated structure and has room for improvement.

Moreover, the wire which constitutes the connecting member is loose when the hood is lowered. The loose wire may collide with the vehicle body owing to the vibrations of the vehicle body during running. In this case, since noise occurs due to the collision of the wire with the vehicle body, it is necessary to carefully make design so that the wire does not become a noise source.

SUMMARY OF THE INVENTION

The present invention has been made in view of the above-described points, and aims to provide a vehicle hood apparatus which causes a hood holding mechanism to hold a hood lifted up by a predetermined amount and restricts the movement of the lifted-up hood toward the rear of the vehicle, and which allows the hood holding mechanism and a mechanism which restricts the movement of the hood toward the rear of the vehicle to be easily mounted to the vehicle body by means of a simple construction and enables a reduction in the number of mounting steps.

According to a first aspect of the present invention, there is provided a vehicle hood apparatus which, when a vehicle collides with an obstacle, lifts up by a predetermined amount a rear end portion of a hood provided at a front portion of the vehicle and causes a hood holding mechanism to hold the position of the lifted-up rear end portion and restricts a movement of the lifted-up rear end portion toward the rear of the vehicle. The hood holding mechanism includes a bendable link which bends or stretches according to an up or down movement of the hood, and an auxiliary link which restricts movement of the bendable link toward the rear of the vehicle. The bendable link includes a lower link rotatably secured at one end to a bracket mounted to a body of the vehicle, an upper link rotatably secured at one end to the hood, and a hinge portion which rotatably connects the other end of the lower link and that of the upper link to each other. The auxiliary link mechanism includes two links which are connected between a position offset from and close to the hinge portion and a front portion of the bracket, and the two links are connected to each other so that they bend or stretch according to bending or stretching of the bendable link.

According to an embodiment, a specific construction of the auxiliary link mechanism includes, for example, a lower auxiliary link rotatably secured at one end to the front portion of the or bracket, an upper auxiliary link rotatably secured at one end to a position offset from the hinge portion, and an auxiliary hinge portion which rotatably connects the other end of the lower auxiliary link and that of the upper auxiliary link to each other. The other end of the lower auxiliary link and that of the upper auxiliary link respectively have stoppers which engage with or disengage from each other when both links bend or stretch.

During the normal state in which the hood is lowered, the bendable link is folded. If the vehicle collides with an obstacle, the hood is lifted up by a predetermined amount and the bendable link is stretched to hold the lifted-up state of the hood. The movement of the bendable link toward the rear of the vehicle is restricted by the auxiliary link mechanism, whereby the movement of the hood toward the rear of the vehicle is restricted. Accordingly, the rear end of the hood is prevented from approaching the windshield of the vehicle more closely than necessary.

The bendable link and the auxiliary link mechanism are secured to a bracket mounted to the frame of the vehicle body. Accordingly, the hood holding mechanism provided with a mechanism which restricts the movement of the hood toward the rear of the vehicle can easily be mounted to the vehicle body by means of a simple construction and the number of mounting steps is reduced.

Since the mechanism which restricts the movement of the hood toward the rear of the vehicle is constituted by the auxiliary link mechanism, when the hood lies at the original position where it is not yet lifted, the auxiliary link mechanism is folded similarly to the bendable link. Accordingly, the auxiliary link mechanism is prevented from colliding with the vehicle body owing to the vibrations of the vehicle body during running, whereby the occurrence of noise is prevented.

The hood holding mechanism is made of the bendable link and the auxiliary link mechanism, and the number of links used is large. Accordingly, a shock due to a collision of the vehicle is dispersed among these numerous links, whereby an excessive shock is prevented from acting on part of the links or relevant components.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

The following description is merely exemplary in nature and is in no way intended to limit the invention, its application or uses.

Figure 1:
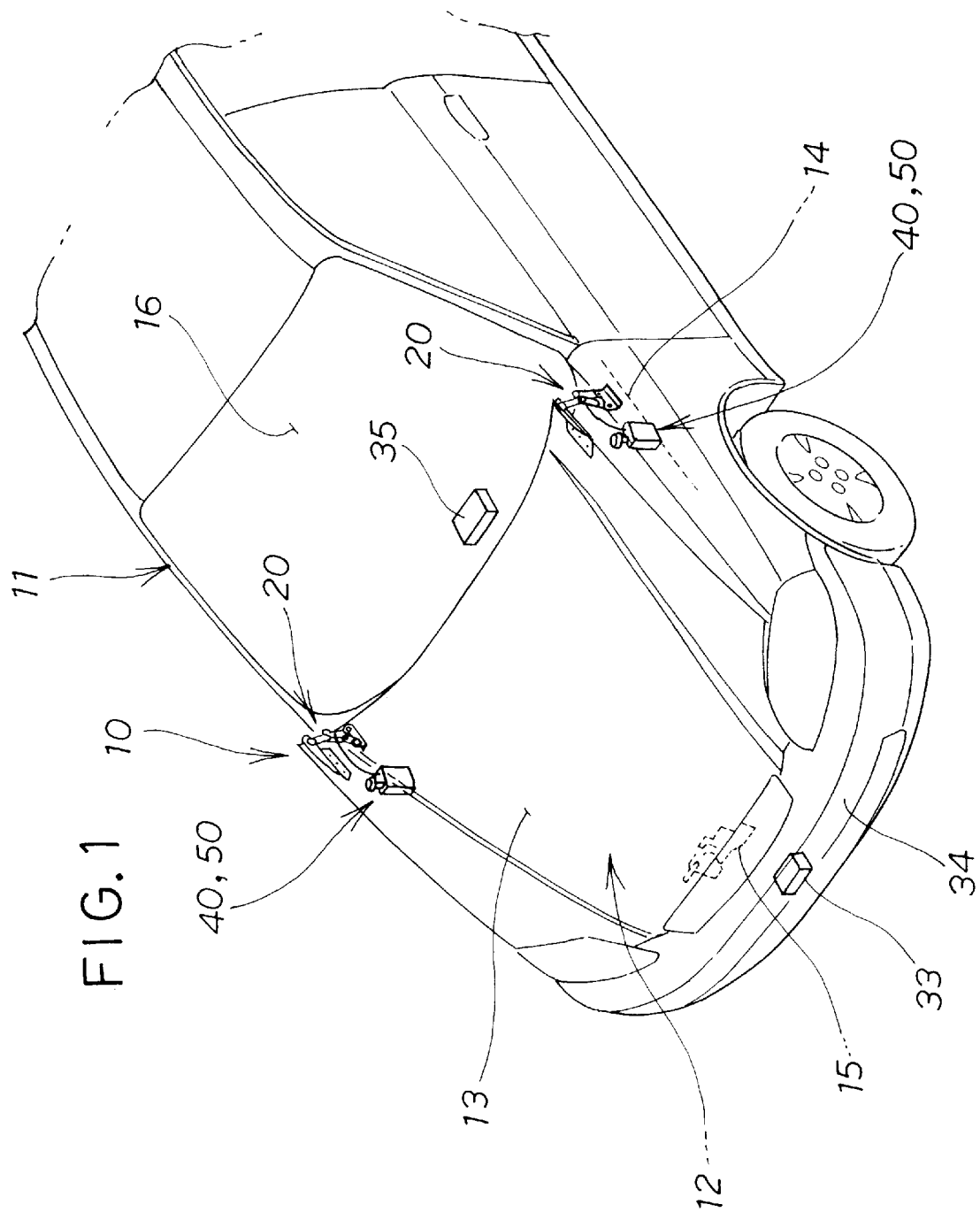
FIG. 1 is a perspective view showing a vehicle provided with a vehicle hood apparatus according to the present invention.
Figure 2:
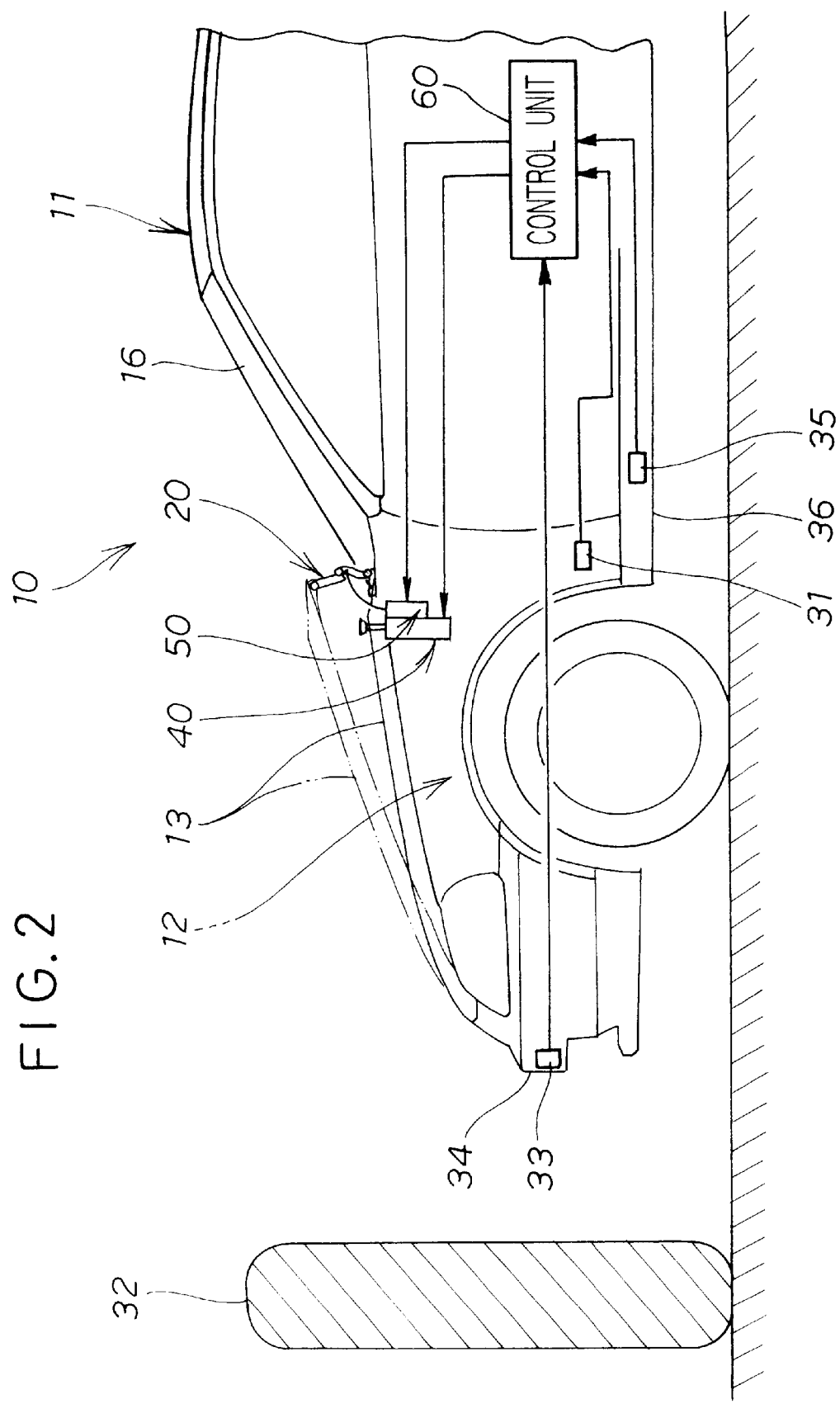
FIG. 2 is a side view of the vehicle, showing the relationship between various sensors, a hood lifting actuator, a hood lowering actuator and a control unit.

Referring to FIGS. 1 and 2, a vehicle 11 has an engine room 12 in its front portion. The open portion of the engine room 12 is covered with a hood 13. Rear end of the hood 13 is openably secured to a vehicle body frame 14 via right and left hood holding mechanisms 20 and 20 provided on the vehicle body frame 14. The front end of the hood 13 is locked to the vehicle body frame 14 by a hood lock 15. In FIG. 1, reference numeral 16 denotes a windshield.

A hood apparatus 10 includes the right and left hood holding mechanism 20 and 20, a vehicle-speed sensor 31 for detecting the vehicle speed of the vehicle 11, a bumper sensor 33, a floor sensor 35, right and left hood lifting actuators 40 and 40, right and left hood lowering actuators 50 and 50, and a control unit 60. The bumper sensor 33 is mounted to a front bumper 34 of the vehicle 11. The floor sensor 35 is mounted to a floor 36 of the vehicle 11. Both sensors 33 and 35 output detection signals when the vehicle 11 collides with an obstacle 32 located forwardly of the vehicle 11. Each of the sensors 33 and 35 is made of an acceleration sensor. The hood lifting actuators 40 lift up the rear end of the closed hood 13 when the vehicle 11 collides with the obstacle 32. The hood lowering actuators 50 return the rear end of the lifted-up hood 13 to the original position.

The control unit 60 controls the hood lifting actuators 40 and the hood lowering actuators 50 on the basis of the output signals of the vehicle-speed sensor 31, the bumper sensor 33 and the floor sensor 35. Specifically, this control unit 60 has (1) the function of determining that the vehicle 11 has collided and outputting a hood lifting signal if the running speed detected by the vehicle-speed sensor 31 is a reference vehicle speed or more and if the control unit 60 receives detection signals from the bumper sensor 33 and the floor sensor 35, and (2) the function of outputting a hood lowering signal when a predetermined time passes after the hood lifting signal has been outputted. This control unit 60 is mainly made of a microcomputer.

In the present invention, the hood apparatus 10 does not need to have both the bumper sensor 33 and the floor sensor 35, and may be provided with at least the bumper sensor 33.

Figure 3:
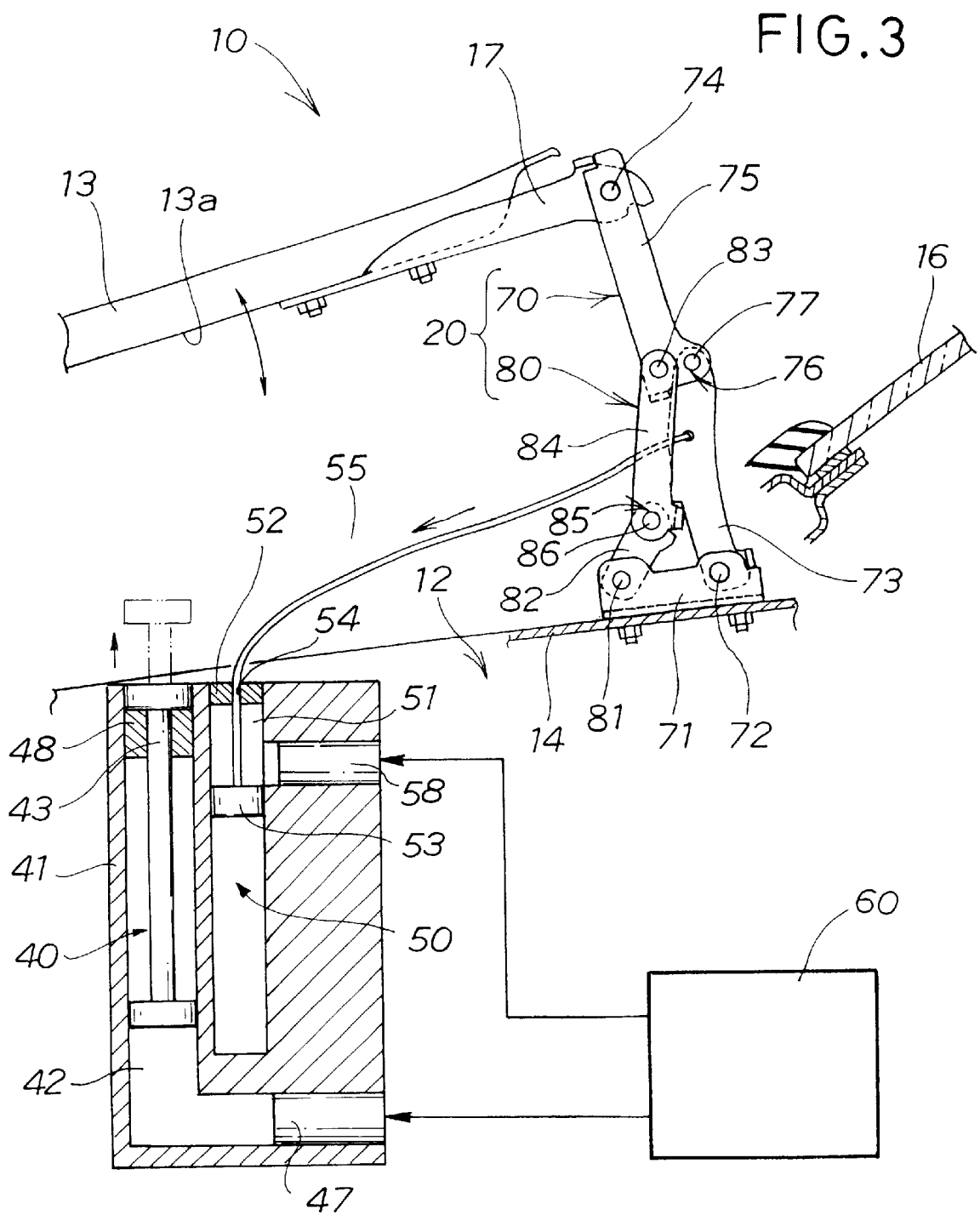
FIG. 3 is a detailed view of the vehicle hood apparatus shown in FIG. 1.

FIG. 3 shows the state in which the rear end of the hood 13 is lifted up by the hood apparatus 10 of the present invention.

Referring to FIG. 3, the hood 13 is provided with a swing arm 17 which extends toward the rear of the vehicle 11. The hood lifting actuator 40 and the hood lowering actuator 50 are accommodated in one housing 41. The housing 41 is mounted to the vehicle body frame 14.

The hood lifting actuator 40 includes a cylinder 42 which is formed in the housing 41 with its top opened, a piston 43 which is inserted for reciprocating motion in the cylinder 42, a lifting inflater 47, and a stopper 48.

The hood lowering actuator 50 includes a cylinder 51 which is formed in the housing 41 with its top opened, a seal 52 which seals the top of the cylinder 51, a piston 53 which is inserted for reciprocating motion in the cylinder 51, a lowering wire 55 which extends outwardly through a hole 54 of the seal 52 of the cylinder 51, and a lowering inflater 58. The extending end of the lowering wire 55 which extends outwardly from the seal 52 is connected to a one-end side (top side) of a lower link 73. When receiving electrical control signals from the control unit 60, the lifting inflater 47 and the lowering inflater 58 cause an igniter (not shown) to ignite a gas-generating agent so as to generate a large amount of gas. This gas is fed to the cylinders 42 and 51. The cylinders 42 and 51 are temporarily increased in pressure by the fed gas. Therefore, the lifting piston 43 ascends, while the lowering piston 53 descends. Since each of the cylinders 42 and 51 actually has a small-diameter orifice (not shown), their inner pressures decrease after the passage of a slight amount of time.

When the lifting inflater 47 receives a hood lifting signal from the control unit 60, the inside of the cylinder 42 is temporarily increased in pressure and the piston 43 of the hood lifting actuator 40 ascends by a predetermined stroke. After that, the piston 43 descends to the original position according to a decrease in the pressure inside the cylinder 42.

When the lowering inflater 58 receives a hood lowering signal from the control unit 60, the inside of the cylinder 51 is temporarily increased in pressure and the piston 53 of the hood lifting actuator 50 ascends by a predetermined stroke. The lowering wire 55 pulled by the descending of the piston 53 pulls the top side (the one-end side) of the lower link 73 toward the front of the vehicle 11. Thus, the lower link 73 swings about a first pin 72 toward the front.

Figure 4:
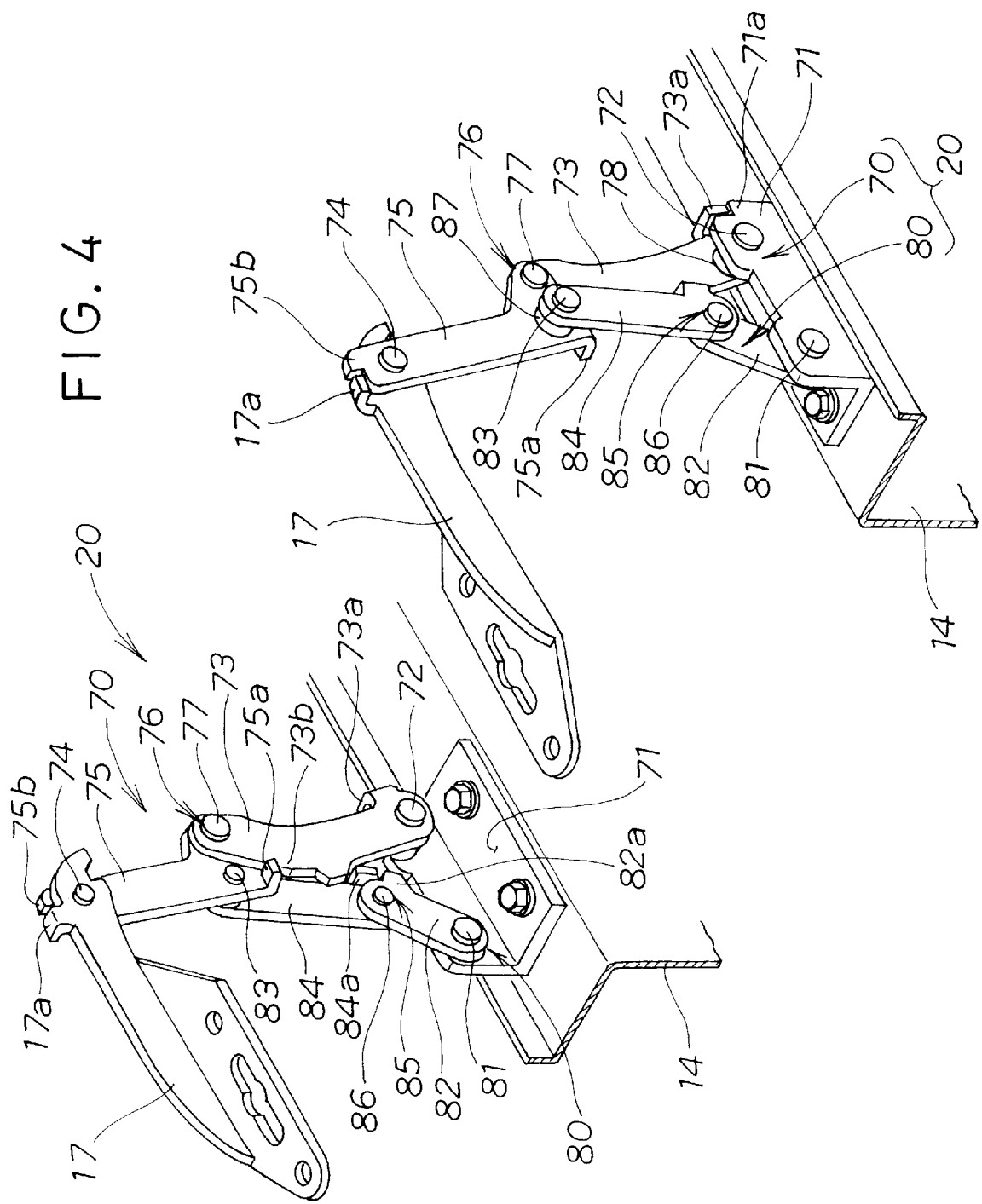
FIG. 4 is a perspective view of the right and left hood holding mechanisms shown in FIG. 3.
Figure 5:
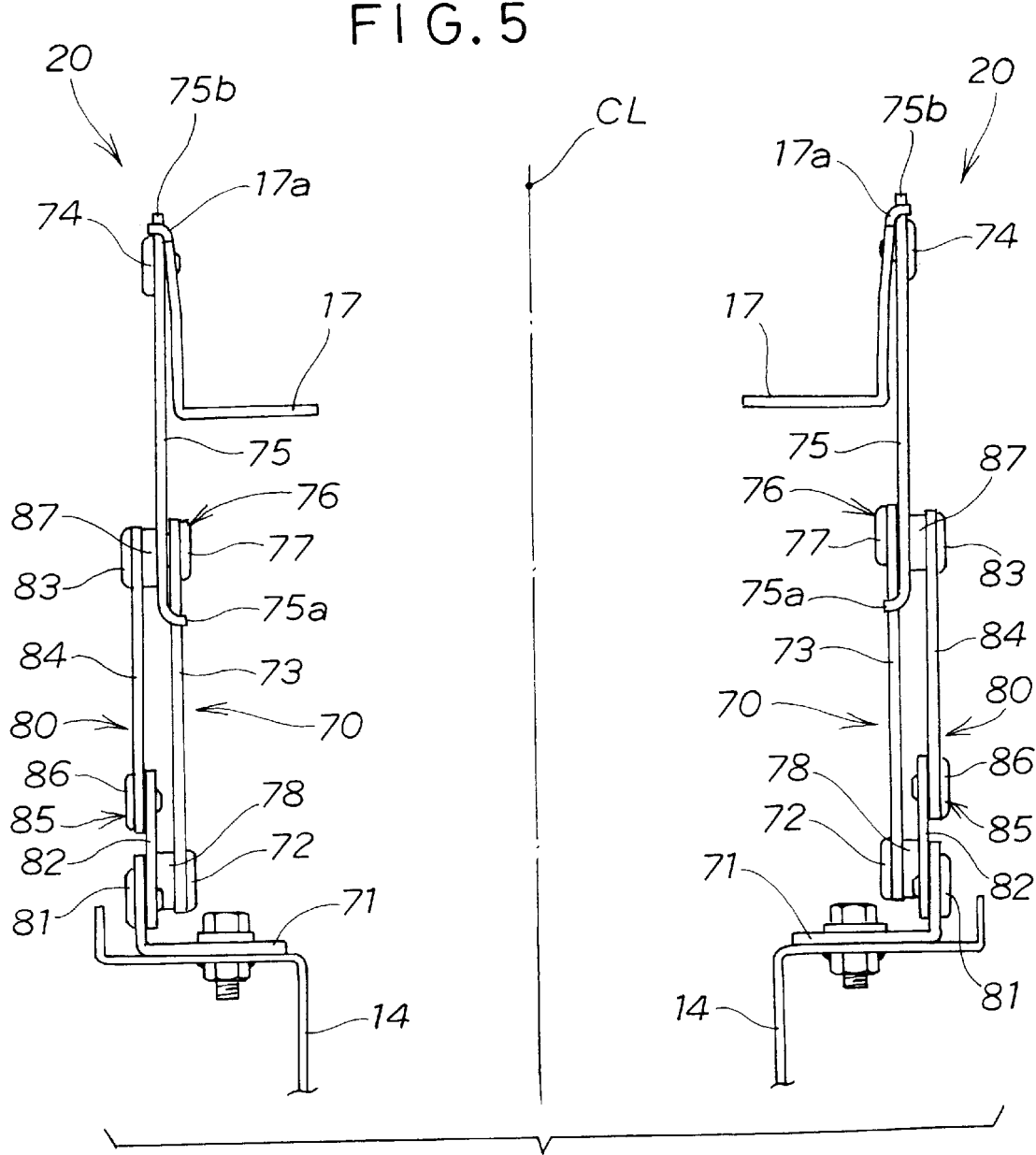
FIG. 5 is a front view of the right and left hood holding mechanisms shown in FIG. 3.

FIGS. 4 and 5 are, respectively, a perspective view and a front elevational view showing the right and left hood holding mechanisms 20 and 20 with the hood 13 being lifted up.

The right and left hood holding mechanisms 20 and 20 are provided on the vehicle 11 symmetrically with respect to the center of the width of the vehicle 11. Since each of the right and left hood holding mechanisms 20 and 20 has the same structure, the same reference numerals are used to denote the same members, and the following description refers to either one of the right and left hood holding mechanisms 20 and 20.

The hood holding mechanism 20 has a bendable link 70 which bends or stretches to follow the up or down motion of the hood 13, and an auxiliary link mechanism 80 which restricts the movement of the bendable link 70.

The bendable link 70 is a link mechanism made of the lower link 73 and an upper link 75 which are rotatably joined by a hinge portion 76. One end of the lower link 73 is secured to a bracket 71, which is mounted to the vehicle body frame 14, so that the lower link 73 can rotate about the first pin 72 toward the front and the rear of the vehicle 11. One end of the upper link 75 is secured to the swing arm 17 so that the upper link 75 can rotate about a second pin 74 toward the front and the rear of the vehicle 11. The other ends of the lower link 73 and the upper link 75 are rotatably joined by a third pin 77, and constitute the hinge portion 76.

The auxiliary link mechanism 80 is joined to be interposed between a front portion of the bracket 71 and the other end of the upper link 75 in such a manner that the auxiliary link mechanism 80 is positioned in the vicinity of the third pin 77 on the front side thereof. This auxiliary link mechanism 80 is link mechanism which bends or stretches in interlocking relation to the bending or stretching motion of the bendable link 70, and restricts the movement of the bendable link 70 to restrict the rearward movement of the lifted-up hood 13 (refer to FIG. 2).

Specifically, the auxiliary link mechanism 80 is a bendable link mechanism made of a lower auxiliary link 82 and an upper auxiliary link 84 which are rotatably joined by an auxiliary hinge portion 85. One end of the lower auxiliary link 82 is secured to the front portion of the bracket 71, which is mounted to the vehicle body frame 14, so that the lower auxiliary link 82 can rotate about the first connecting pin 81 toward the front and the rear of the vehicle 11. One end of the upper auxiliary link 84 is secured to the front portion of the other end of the upper link 75 so that the upper auxiliary link 84 can rotate about the second connecting pin 83 toward the front and the rear of the vehicle 11. The other ends of the lower auxiliary link 82 and the upper auxiliary link 84 are rotatably joined by a third auxiliary pin 86, and constitute the auxiliary hinge portion 85.

The bendable link 70 and the auxiliary link mechanism 80 are secured to the vehicle body frame 14 via the bracket 71 mounted to the vehicle body frame 14. Accordingly, the hood holding mechanism 20 can easily be mounted to the vehicle 11 by means of a simple construction, whereby the number of mounting steps can be reduced.

The upper link 75 is a member having an L-like shape in side view, which is formed to have the second pin 74 at one end, the third pin 77 at the rear portion of the other end and the second connecting pin 83 at the front portion of the other end.

FIG. 5, reference numerals 78 and 87 denote spacers between the links bendable link 70 and auxiliary link mechanism 80.

Figure 6:
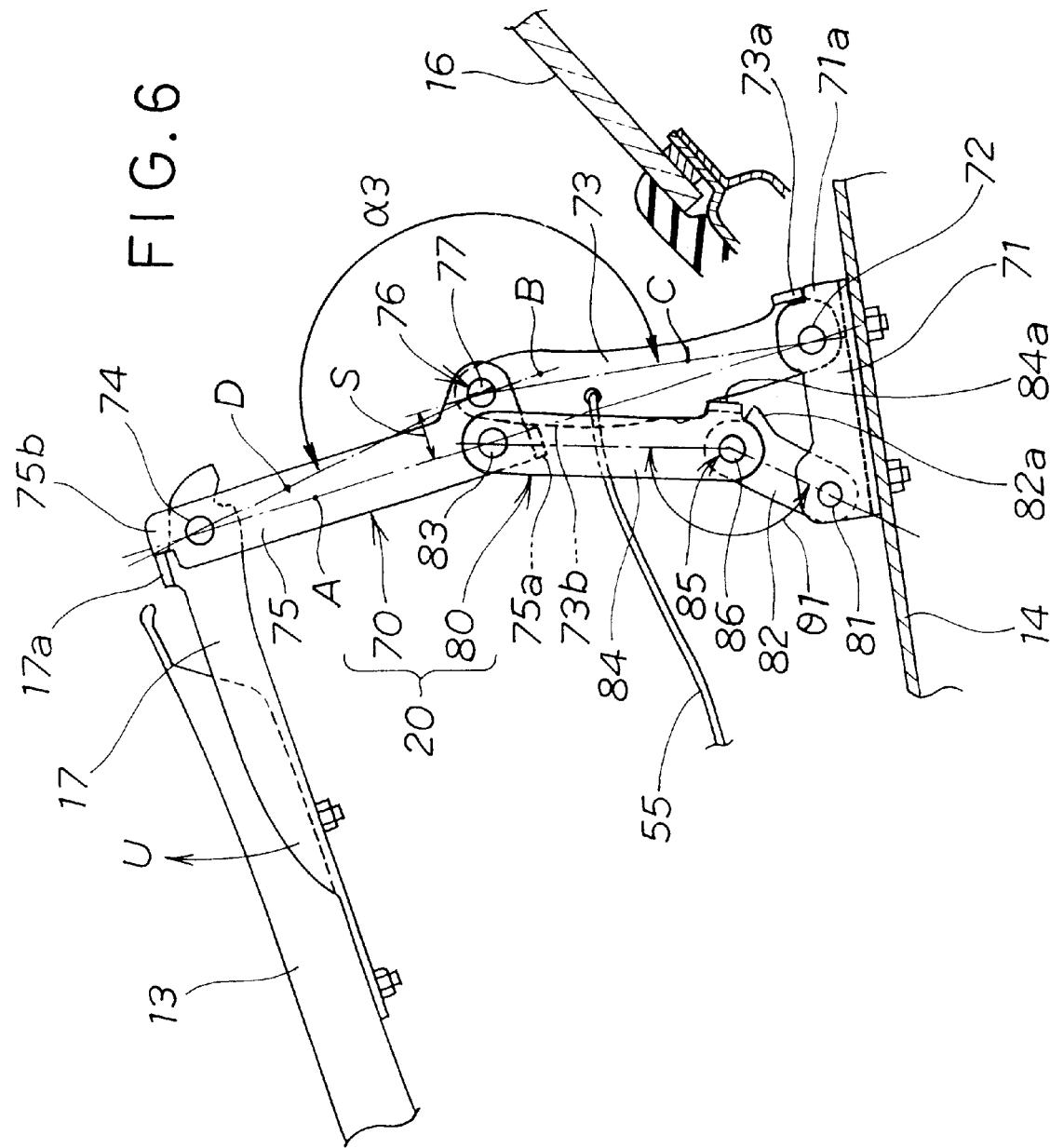
FIG. 6 is a side view of one of the hood holding mechanisms shown in FIG. 4.

As shown in FIG. 6, the bendable link 70 is a mechanism which holds the rear end of the hood 13 in a lifted-up state. The bendable link 70 is in a stretched state when the rear end of the hood 13 is in the lifted-up state. When the bendable link 70 is in the stretched state, the hinge portion 76 is offset by a distance S toward the rear of the vehicle 11.

Specifically, the center B of the third pin 77 is offset toward the rear of the vehicle 11 by the distance S from a straight line A which passes the center of the first pin 72 and the center of the second pin 74.

The bendable link 70 is provided with an upper stopper 75a and a lower stopper 73a to restrict the angle between the lower link 73 and the upper link 75 within an fully open angle α3 so that such angle does not exceed the fully open angle α3 when the bendable link 70 is stretched from its bent state and the lower link 73 and the upper link 75 are fully opened. Specifically, the lower link 73 has the lower stopper 73a formed as a projection at the rear-end side of the one end. The upper link 75 has the upper stopper 75a formed as a projection at the front-end side of the other end.

The lower stopper 73a collides with a rear upper end 71a of the bracket 71, thereby preventing the lower link 73 from swinging further toward the rear of the vehicle 11. The upper stopper 75a comes into contact with a front edge portion 73b of the other end of the lower link 73, thereby preventing the other end portion of the upper link 75 from swinging about the second pin 74 further toward the rear of the vehicle 11. In consequence, the fully open angle α3 is restricted.

The swing arm 17 integrally has an upwardly projecting engagement portion 17a at its rear upper portion. The upper link 75 has at the one end a stopper portion 75b which is brought into and out of engagement with the engagement portion 17a.

The swing arm 17 is rotatable about the second pin 74 in the direction of an arrow U together with the hood 13.

The auxiliary link mechanism 80 is provided with two opening angle restricting stoppers 82a and 84a for restricting the fully open angle of the auxiliary link mechanism 80. Specifically, the lower auxiliary link 82 has at the other end a lower auxiliary link stopper 82a which is formed integrally with the lower auxiliary link 82 so as to project toward the rear of the vehicle 11. The upper auxiliary link 84 has at the other end an upper auxiliary link stopper 84a which is formed integrally with the upper auxiliary link 84 so as to project toward the center of the width of the vehicle 11. When the lower auxiliary link 82 and the upper auxiliary link 84 are opened about the auxiliary hinge portion 85 and the auxiliary link mechanism 80 is stretched, the lower auxiliary link stopper 82a and the upper auxiliary link stopper 84a are brought into engagement with each other, whereby the extent of opening of the links 82 and 84 is restricted.

As shown in FIG. 6, when the hood 13 is in the lifted-up state, the two opening angle restricting stoppers 82a and 84a are separated from each other by a slight degree, and the angle θ1 at which the auxiliary link mechanism 80 is opened is slightly smaller than the fully open angle of the auxiliary link mechanism 80.

The operation of the hood holding mechanism 20 having the above-described construction will be described below with reference to FIGS. 6 to 11.

Figure 7:
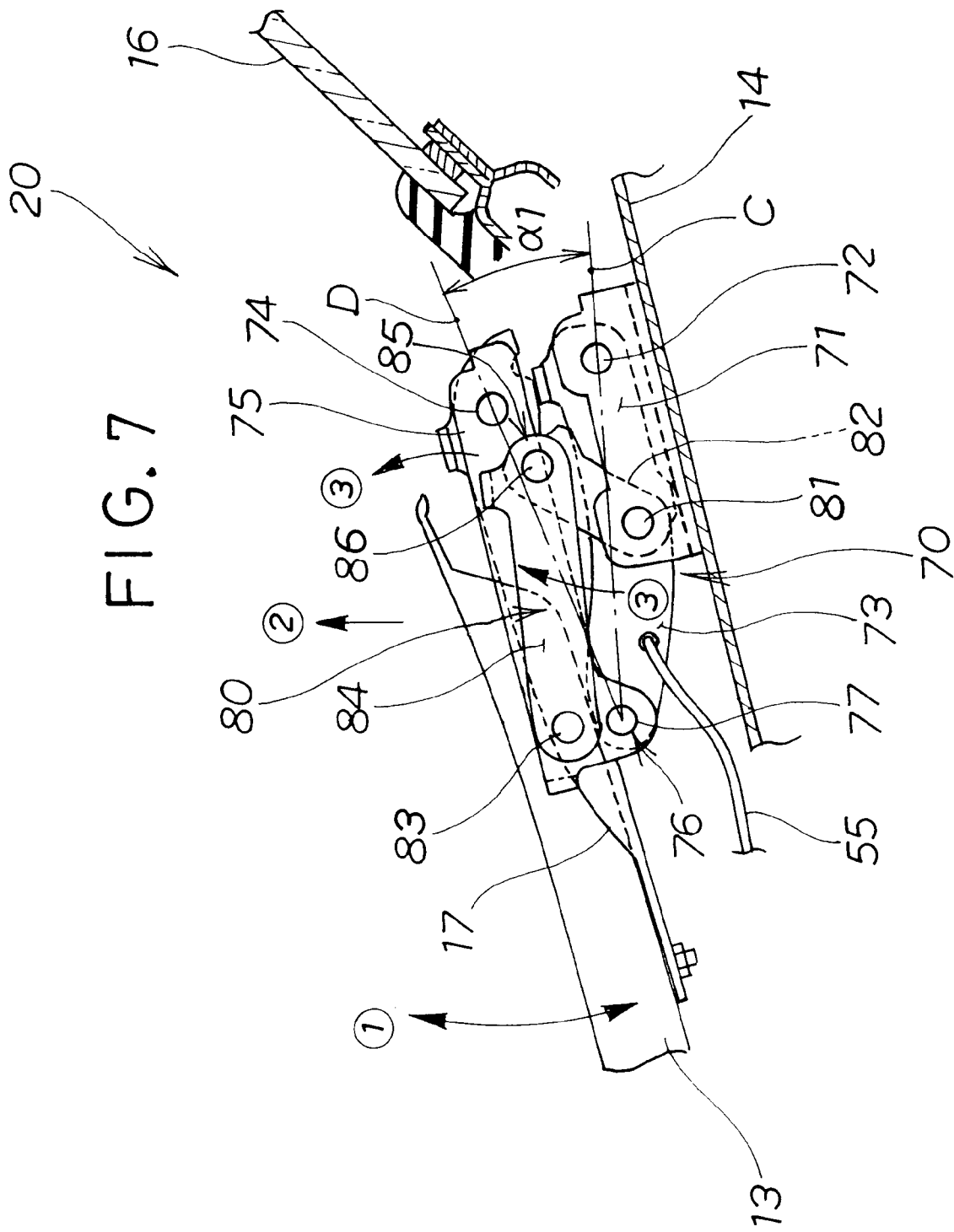
FIGS. 7 to 10 are side views showing the operation of the hood holding mechanism.

FIG. 7 shows a normal state in which the hood 13 is lowered and the engine room 12 is closed. At this time, the lower link 73 and the upper link 75 which constitute the bendable link 70 are bent about the third pin 77 and the hinge portion 76 is positioned at a location displaced toward the front of the vehicle 11.

A line C is a straight line which passes through the center of the first pin 72 and the center of the third pin 77, and a line D is a straight line which passes through the center of the second pin 74 and the center of the third pin 77. If the center of the third pin 77 is the intersection point of the straight lines C and D, the angle made by the straight lines C and D is α1. This angle α1 is the angle at which the bendable link 70 is completely bent and the hood 13 is completely closed.

When the hood 13 lies at the original position where it is not yet lifted (a closed position), the auxiliary link mechanism 80 is in a folded state similarly to the bendable link 70, and the auxiliary hinge portion 85 is positioned at a location displaced toward the rear of the vehicle 11. When the auxiliary link mechanism 80 is in the folded state, the auxiliary link mechanism 80 does not collide with the vehicle body of the vehicle 11 owing to vibrations of the vehicle body during running, whereby the occurrence of noise is prevented.

The hood 13 can be opened or closed about the second pin 74 in the upward or downward direction as indicated by an arrow (1).

If the rear end of the hood 13 is lifted upwardly as indicated by an arrow (2) with the front portion of the hood 13 being locked to the vehicle body frame 14, the upper link 75 starts to rotate about the third pin 77 in the counterclockwise direction as indicated by an arrow (3), while the lower link 73 starts to rotate about the first pin 72 in the clockwise direction as indicated by another arrow (3). The auxiliary link mechanism 80 starts its stretching motion in interlocking relation to the stretching motion of the bendable link 70.

Figure 8:
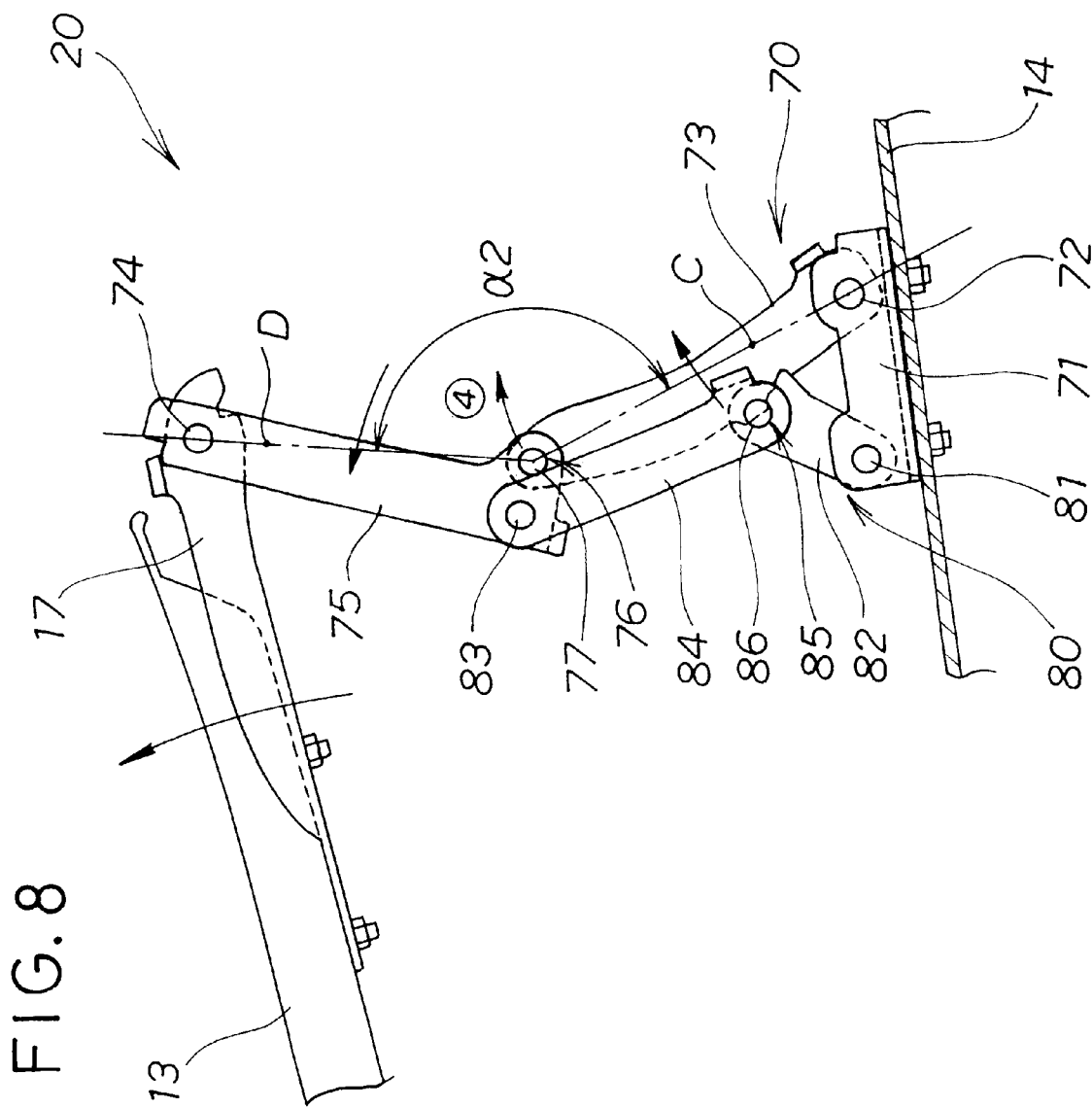

FIG. 8 shows a state in which the rear end of the hood 13 is lifted to an intermediate upward position from the closed position shown in FIG. 7. The lower link 73 rotates about the third pin 77 in the counterclockwise direction, while the upper link 75 rotates about the first pin 72 in the clockwise direction, so that the third pin 77 moves toward the rear of the vehicle 11 as indicated by an arrow (4). At this time, the angle made by the straight lines C and D at the intersection point thereof which is the center of the third pin 77 is α2. This angle α2 is an obtuse angle which is greater than the fully close angle α1 shown in FIG. 7, and as the hood 13 is lifted upwardly, the degree of opening of the bendable link 70 increases. Accordingly, the degree of opening of the auxiliary link mechanism 80 also increases.

Figure 9:
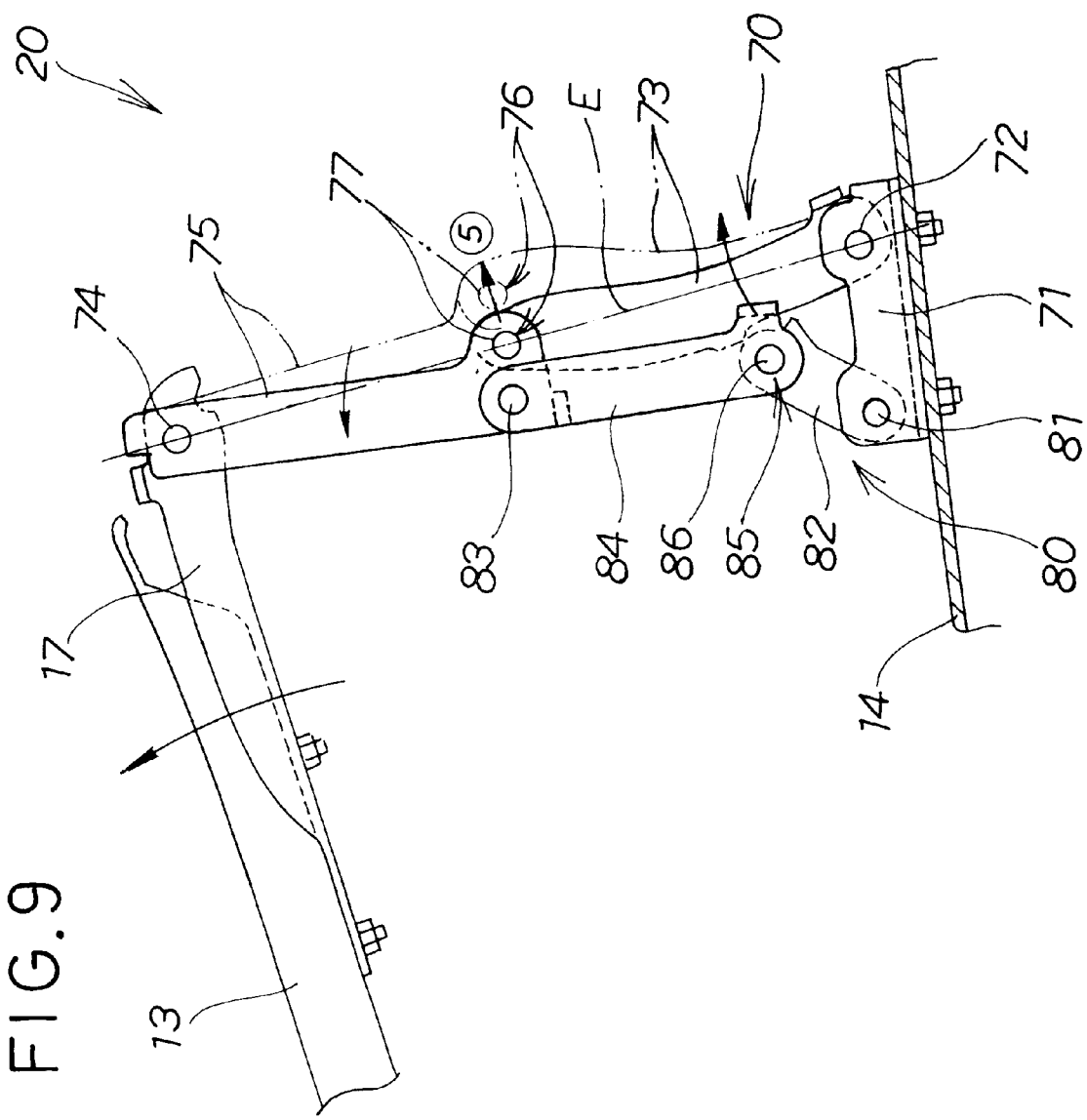

FIG. 9 shows a state in which the rear end of the hood 13 is lifted further upwardly from the position shown in FIG. 8 and the first pin 72, the second pin 74 and the third pin 77 are arrayed along a straight line E. Since the hood 13 is thrust up with great force, the third pin 77 is moved beyond the straight line E toward the rear of the vehicle 11 as indicated by an arrow (5), by the inertia force of the hood 13.

When the third pin 77 is positioned at a location displaced beyond the straight line E toward the rear of the vehicle 11 as shown by an alternate long and two short dashes line, as shown in FIG. 6, the lower stopper 73a engages with the rear upper end 71a of the bracket 71, while the upper stopper 75a engages with the front edge portion 73b of the other end of the lower link 73. At this time, the angle made by the straight lines C and D at the intersection point thereof which is the center of the third pin 77 is α3. This angle α3 is the angle at which the bendable link 70 is fully opened, and is greater than the angle α2 shown in FIG. 8 and exceeds 180°. The rear end of the hood 13 reaches its maximum lift-up quantity.

As described above, the bendable link 70 changes from the fully close angle α1 which corresponds to the lowered state of the hood 13 shown in FIG. 7, to the angle α3 which corresponds to the lifted state of the hood 13 shown in FIG. 6.

Figure 10:
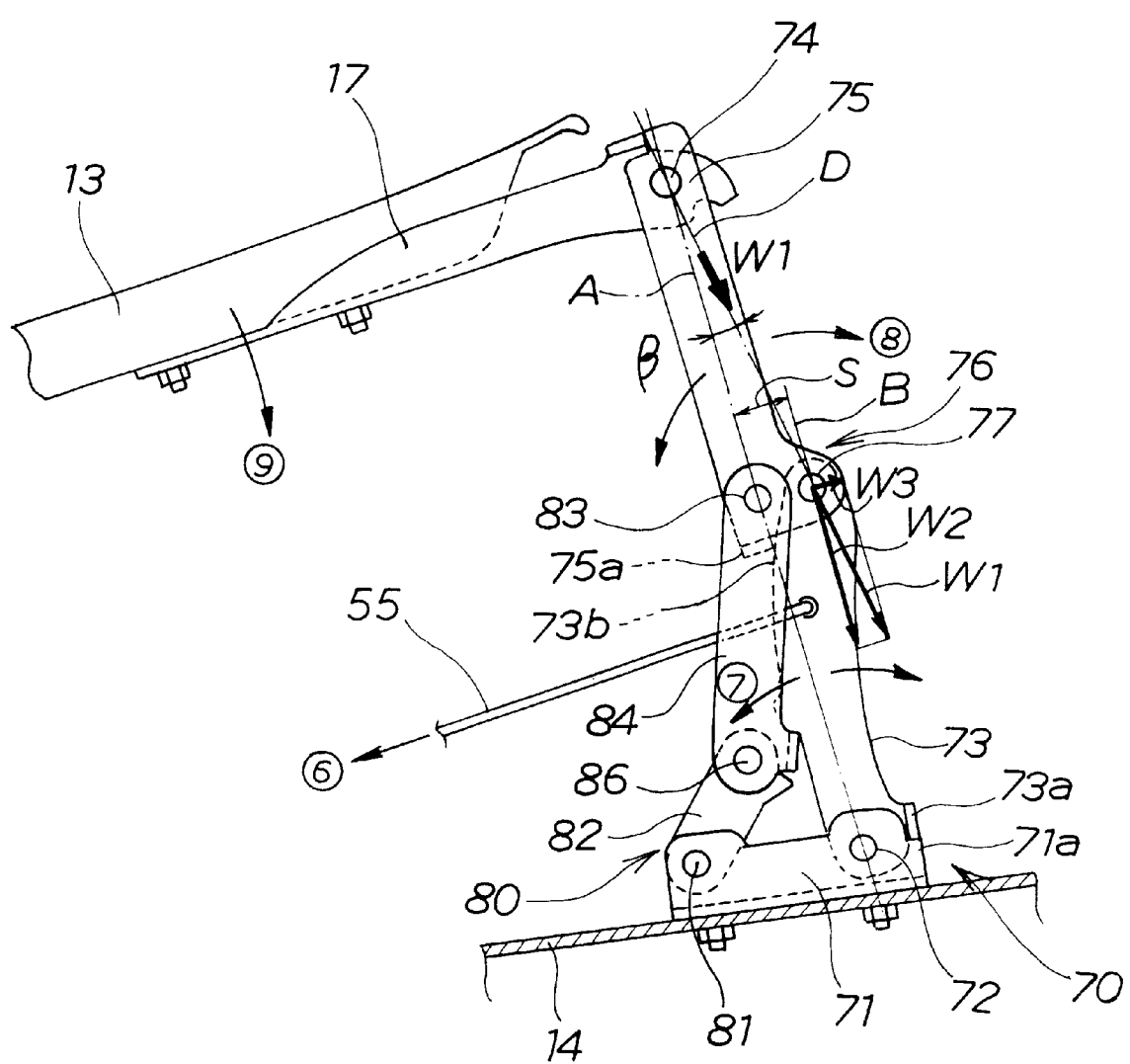

The operation of the hood holding mechanism 20, particularly, acting forces applied to the third pin 77, with the rear end of the hood 13 being lifted up by a predetermined amount, will be described below with reference to FIG. 10.

When the rear end of the hood 13 is in the state of being lifted up by the predetermined amount, the lower stopper 73a is in abutment with the bracket 71, so that the lower link 73 cannot rotate about the first pin 72 in the clockwise direction. Since the upper stopper 75a is in abutment with the lower link 73, the upper link 75 cannot rotate about the third pin 77 in the counterclockwise direction. Since the front portion of the hood 13 is locked to the vehicle body frame 14 by the hood lock 15 (refer to FIG. 1), the hood 13 cannot move toward the front or the rear. Accordingly, the upper link 75 cannot rotate about the third pin 77 in the clockwise direction, either.

When the lower link 73 and the upper link 75 are in an erected (stretched) state, the hinge portion 76 is offset toward the rear of the vehicle 11 from the straight line A which connects the center of the first pin 72 and the center of the second pin 74, and the straight line D which connects the center of the second pin 74 and the center of the third pin 77 is inclined by an angle β with respect to the straight line A.

When a down load W1 along the straight line D acts on the second pin 74 from the hood 13, the down load W1 acts on the third pin 77. According to the angle β, the load W1 acting on the third pin 77 is divided into a down component W2 and a lateral component W3 which acts toward the rear of the vehicle 11. The component W3 rotates lower link 73 about the first pin 72 in the clockwise direction. However, as described above, because the lower stopper 73a is in engagement with the bracket 71, the lower link 73 cannot rotate.

In this manner, when the rear end of the hood 13 is lifted up by the predetermined amount, a force which urges the hinge portion 76 toward the rear of the vehicle 11 at all times acts on the hinge portion 76 owing to the weight of the hood 13. Therefore, the lower link 73 and the upper link 75 are prevented from being folded at the hinge portion 76 toward the front of the vehicle 11, whereby the bendable link 70 is held in a stably erected state. Accordingly, the lift-up position of the hood 13 can be reliably held by the hood holding mechanism 20. A mechanism for holding the lifted-up hood 13 need not, therefore, be provided in the hood lifting actuator 40 (refer to FIG. 3). In addition, the hood lifting actuator 40 need not be connected to the hood 13 or the hood holding mechanism 20.

If the lowering wire 55 is pulled toward the front of the vehicle 11 as indicated by an arrow (6) when the hood holding mechanism 20 is in the above-described erected state, the lower link 73 rotates about the first pin 72 in the counterclockwise direction as indicated by an arrow (7). The upper link 75 rotates about the third pin 77 in the clockwise direction as indicated by an arrow (8). Accordingly, the hood holding mechanism 20 is gradually folded, and the rear end of the hood 13 lowers as indicated by an arrow (9) and returns to the original position.

The operation of the hood apparatus 10 having the above-described construction will be described below with reference to FIGS. 11 to 15.

Figure 11:
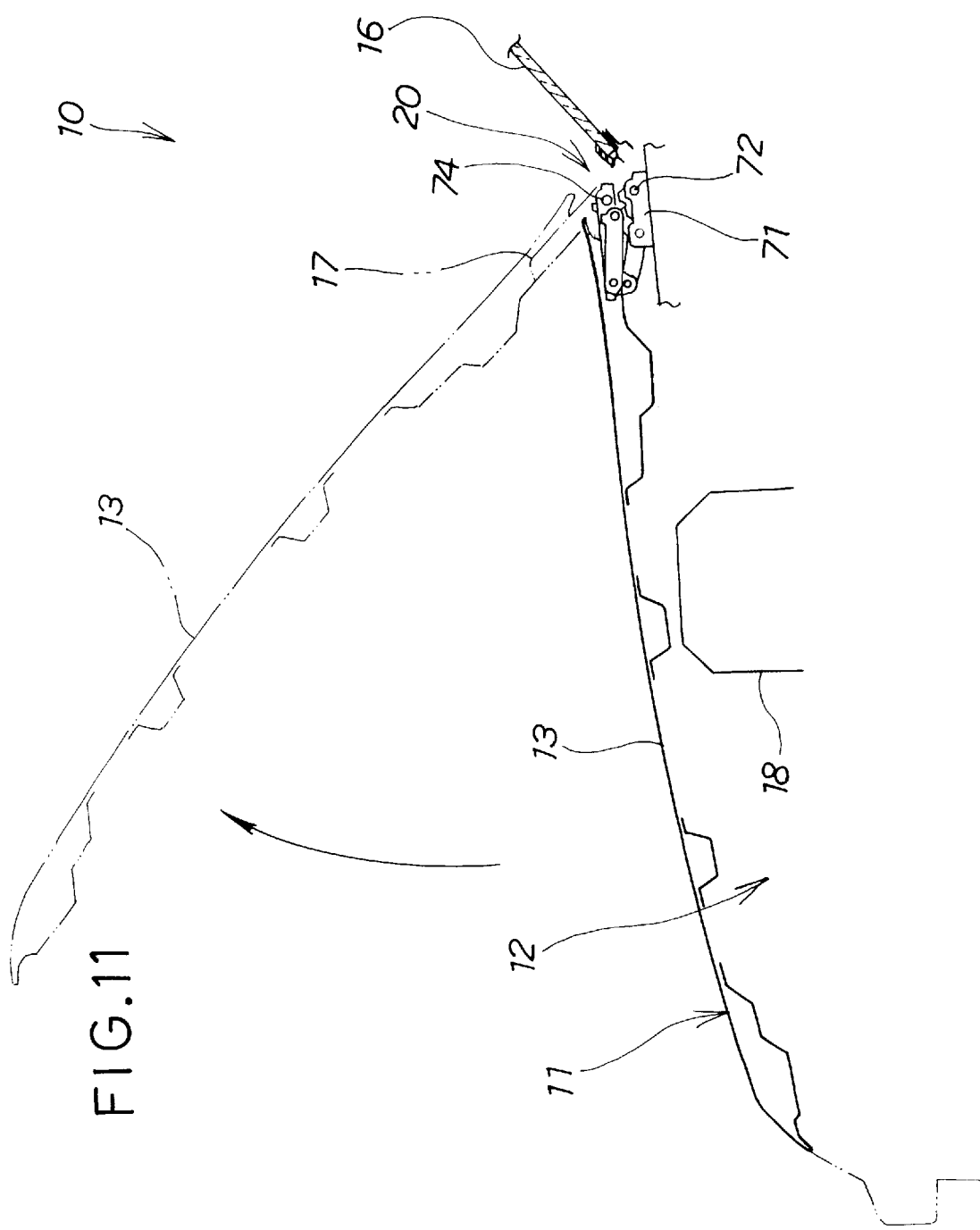
FIGS. 11 to 15 are schematic views showing the operation of the vehicle hood apparatus.

FIG. 11 shows a normal state in which the hood 13 is lowered and the engine room 12 is closed with the hood holding mechanism 20 folded.

Referring to FIG. 11, the hood 13 can be opened and closed about the second pin 74. The maintenance and inspection of equipment 18 accommodated in the engine room 12 is performed with the hood 13 opened as shown by imaginary lines.

Figure 12:
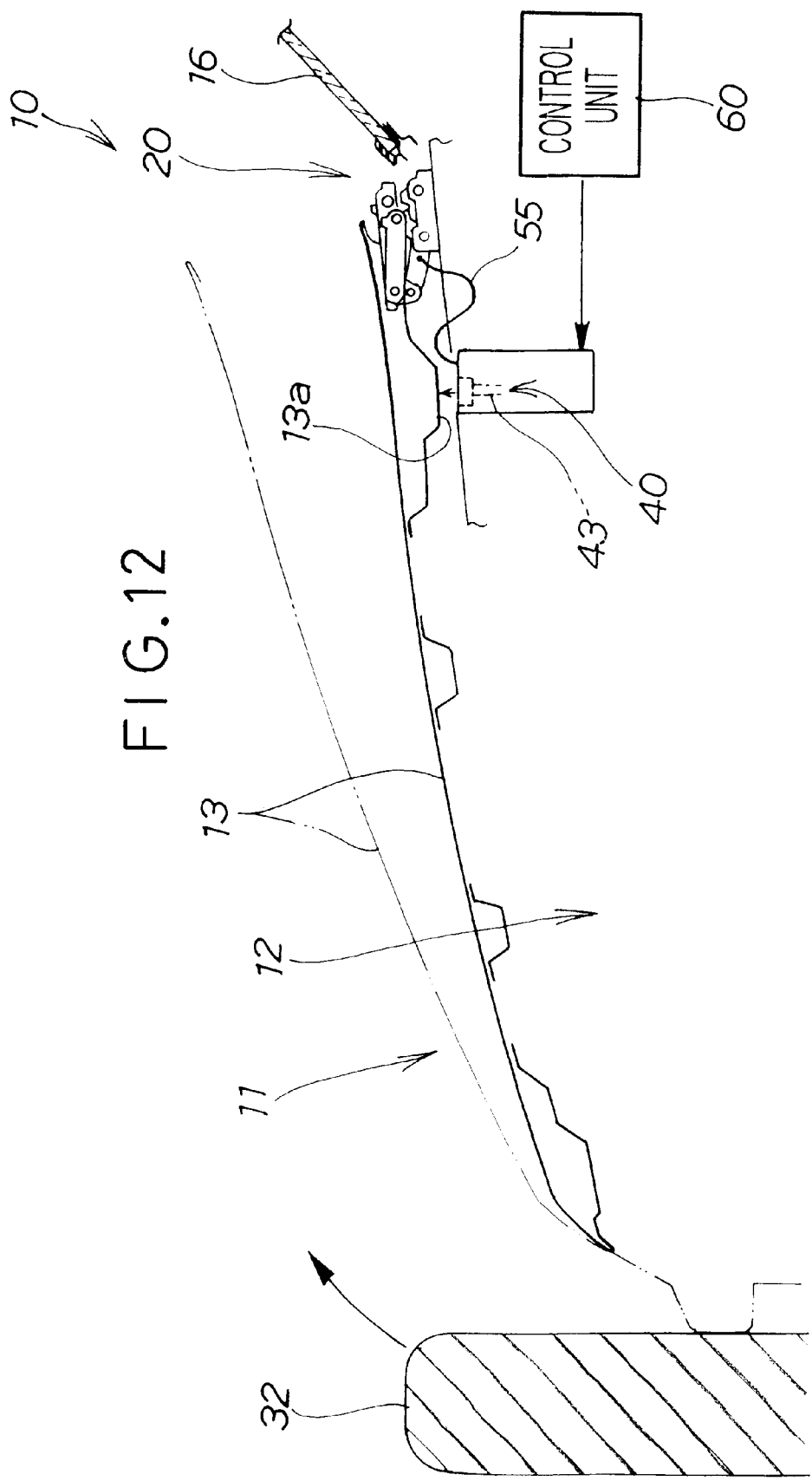

FIG. 12 shows a state in which the vehicle 11 has collided with the obstacle 32.

If the vehicle 11 collides with the obstacle 32 during running at a predetermined vehicle speed or more, the control unit 60 outputs a hood lifting signal. On the basis of the signal, the hood lifting actuator 40 starts its lifting motion, and projects the piston 43 upwardly at a high speed, thereby thrusting up a rear-end reverse surface 13a of the hood 13.

Figure 13:
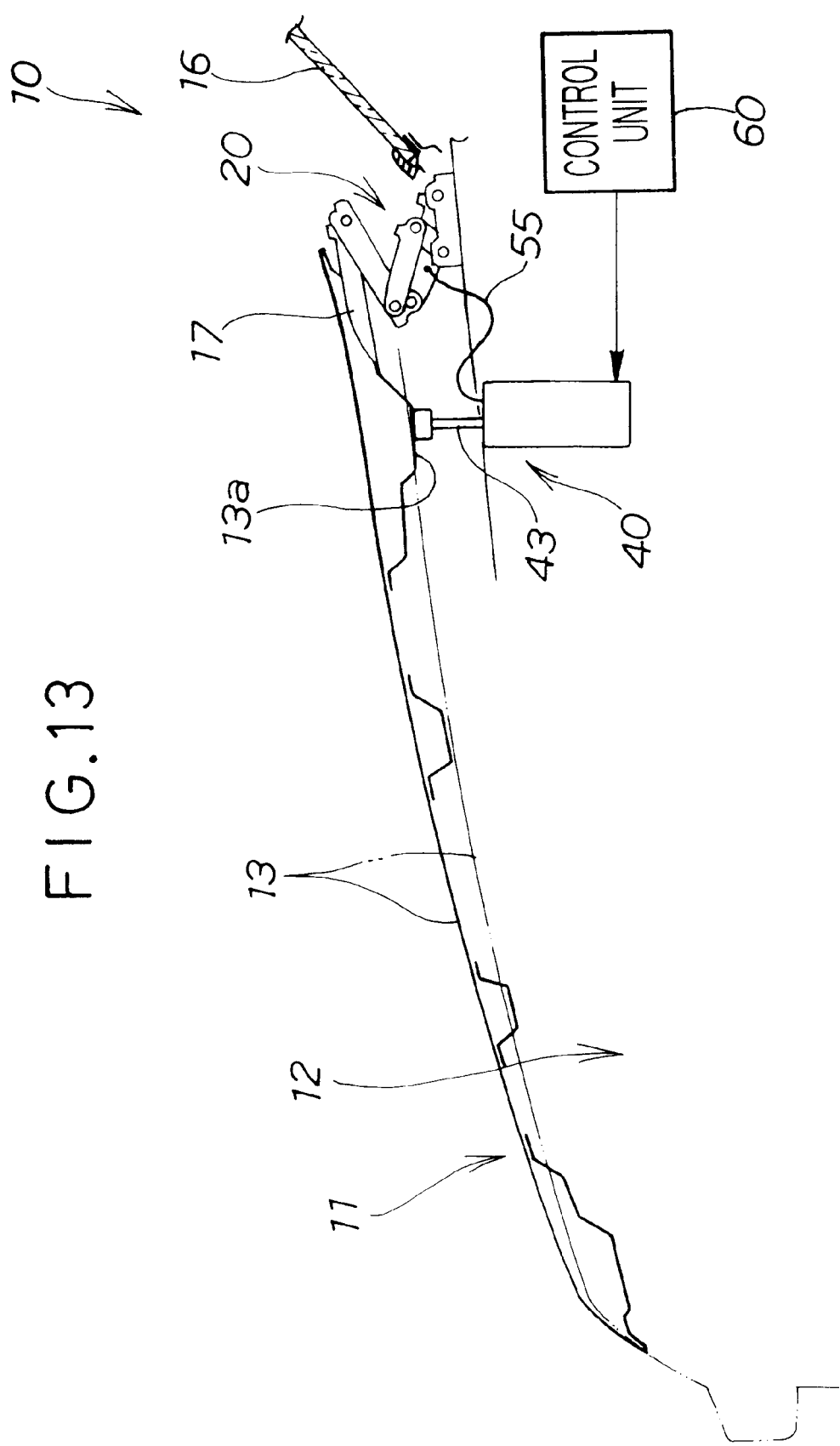

In this manner, since the rear end of the hood 13 is instantaneously thrust up by the piston 43, the hood 13 is thrust from the original height shown by an imaginary line up to the height shown by a solid line, as shown in FIG. 13. The hood 13 which has been instantaneously thrust up is lifted further upwardly by inertia. The hood holding mechanism 20 is erected with the ascending of the right end of the hood 13.

Figure 14:
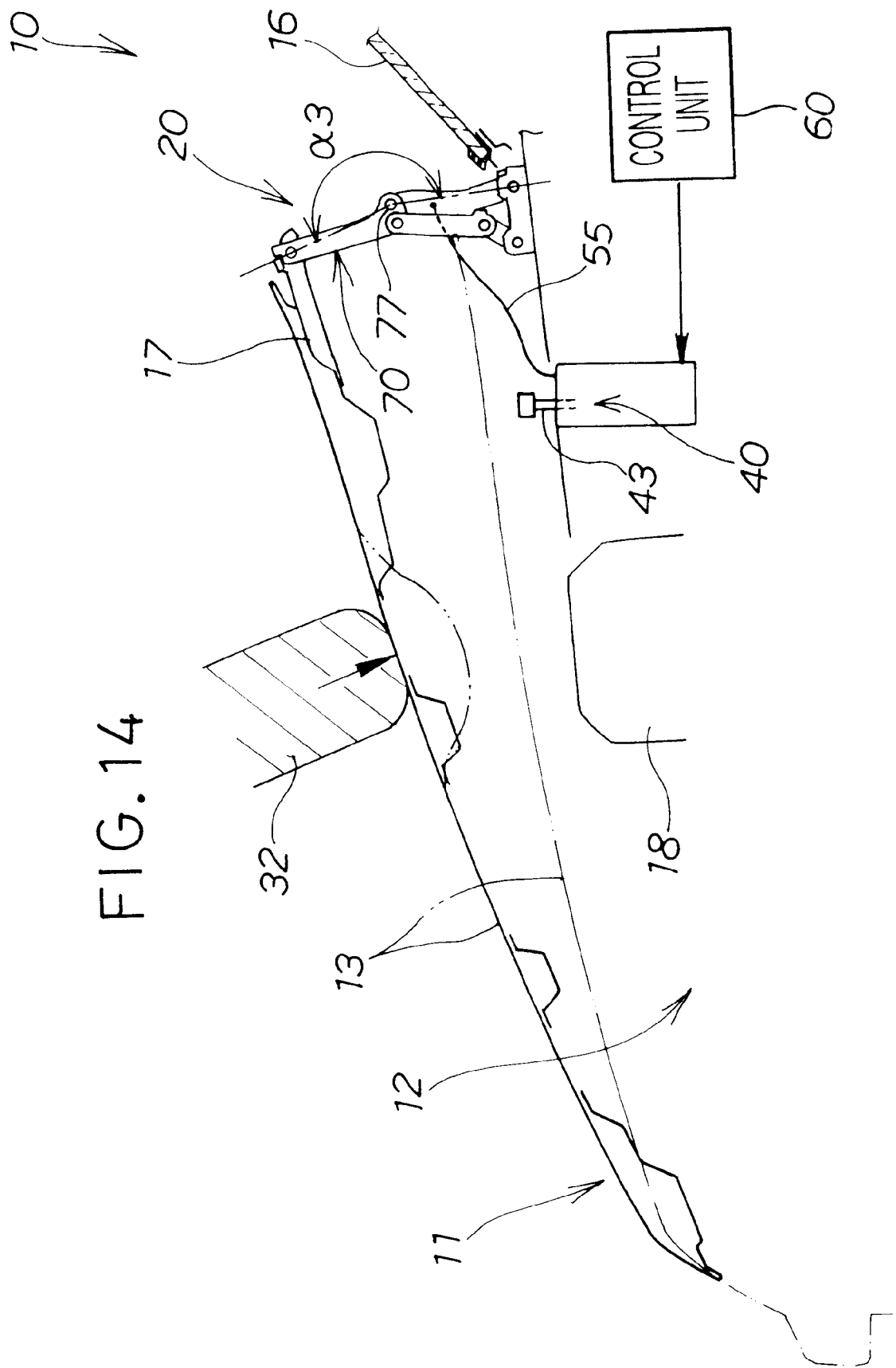

FIG. 14 shows a state in which the bendable link 70 is held in the erected state at the fully open angle $\alpha 3$. The hood 13 ascends no further, and is held by the hood holding mechanism 20 in the state of being lifted from the original position shown by an imaginary line up to the position shown by a solid line by a predetermined amount (for example, approximately 100–200 mm).

A predetermined space is formed between the hood 13 lifted up by the predetermined amount and the equipment 18 such as an engine accommodated in the engine room 12, and the hood 13 becomes downwardly deformable. Accordingly, since the hood 13 lifted up during the collision of the obstacle 32 with the hood 13 is deformed as shown by an imaginary line, a shock given to the obstacle 32 can be sufficiently absorbed. In this manner, it is possible to protect the equipment 18 such as an engine from the obstacle 32, and it is also possible to sufficiently reduce the shock given to the obstacle 32.

Figure 15:
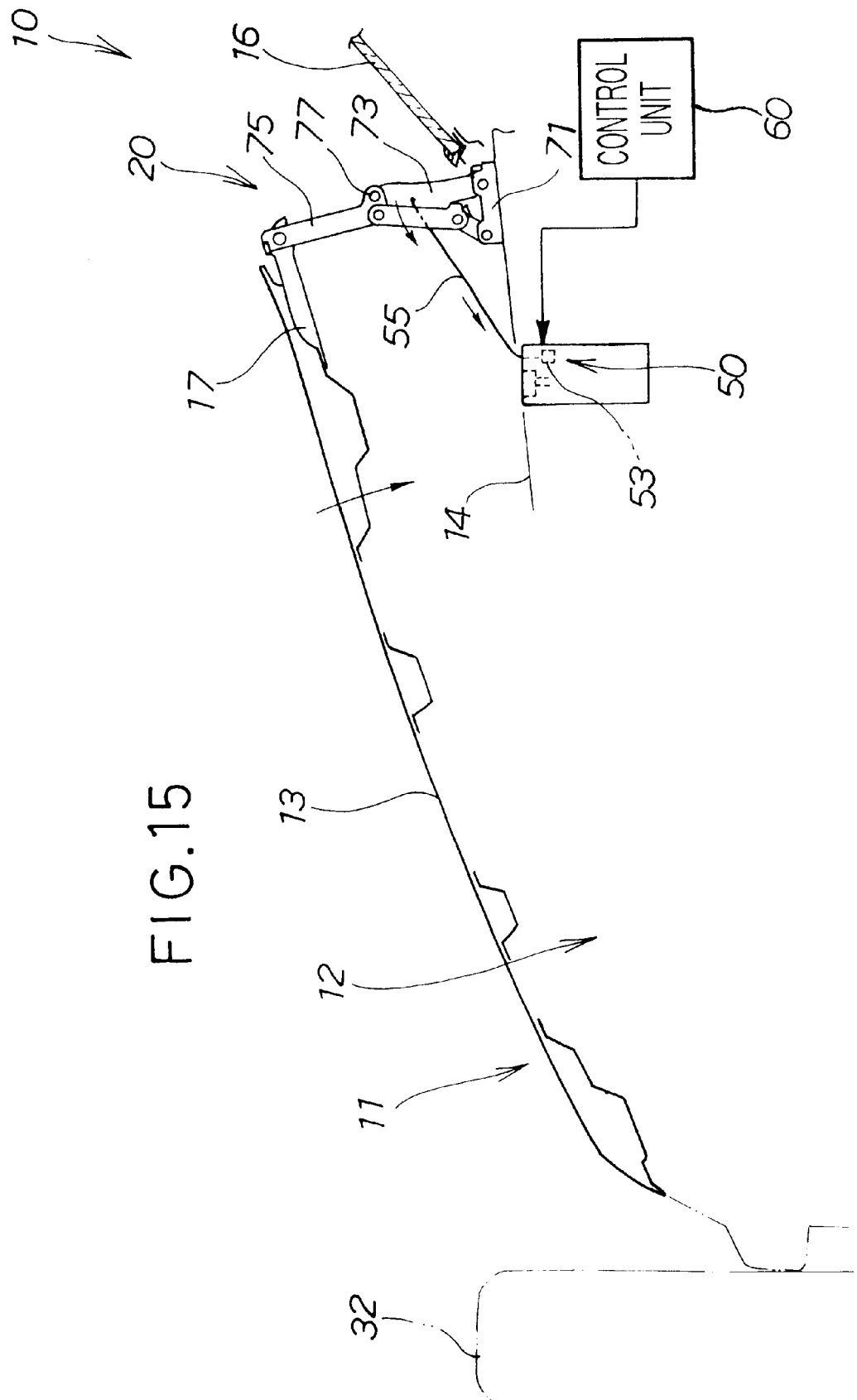

Referring to FIG. 15, when a predetermined time passes after the vehicle 11 has collided with the obstacle 32 and the hood 13 has been lifted up, the control unit 60 determines that the obstacle 32 does not collide with the hood 13, the control unit 60 outputs a hood lowering signal. The hood lowering actuator 50 starts its lowering motion on the basis of the signal, and retracts the lowering wire 55 at a high speed. The hood holding mechanism 20 is folded, and the hood 13 lowers and returns to the original position where the hood 13 is not lifted.

The operation of the hood apparatus 10 to be executed when the vehicle 11 collides with an obstacle such as a wall will be described below with reference to FIGS. 16 to 24.

Figure 16:
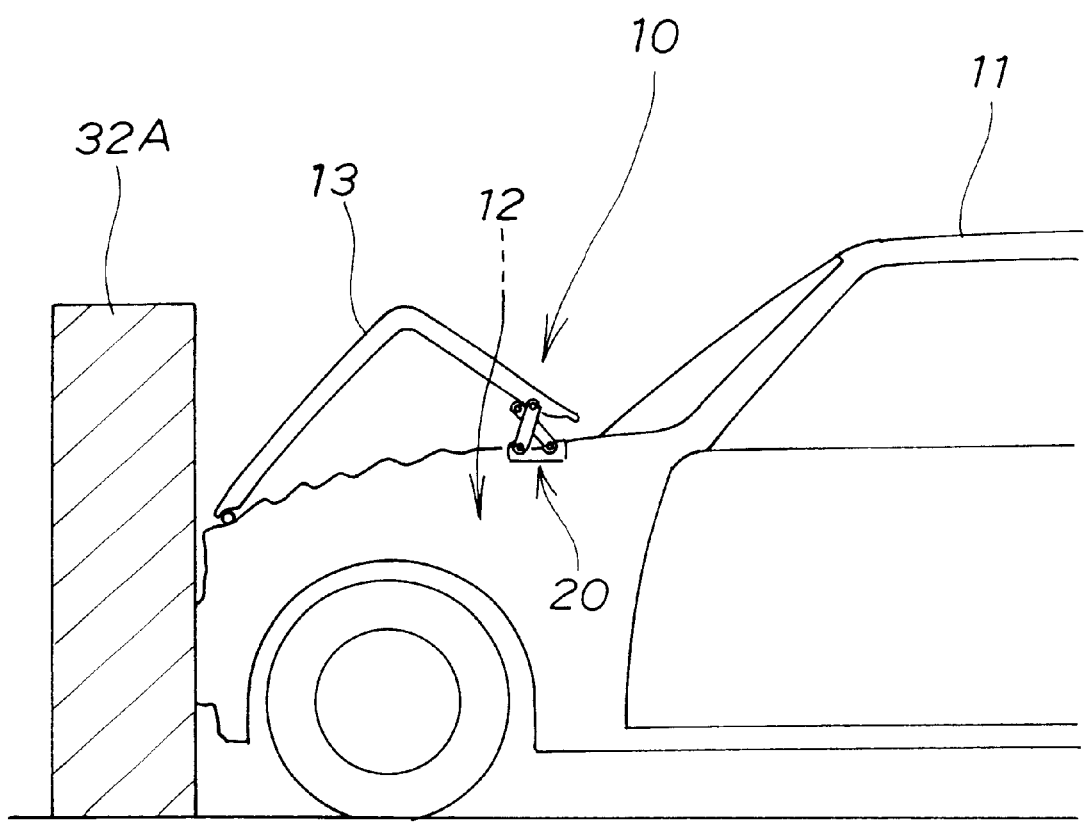
FIG. 16 is a view showing the deformed state of a hood during the collision of a vehicle with an obstacle.

FIG. 16 shows a state in which the vehicle 11 has collided with a rigid obstacle 32A such as a wall. The vehicle 11 absorbs the shock of the collision by allowing the deformation of the engine room 12 and the hood 13. At the same time, on the basis of the detection signals of the vehicle-speed sensor 31, the bumper sensor 33 and the floor sensor 35 shown in FIG. 2, the rear end of the hood 13 is lifted by the hood lifting actuator 40 of the hood apparatus 10, and the position of the lifted rear end of the hood 13 is held by the hood holding mechanism 20.

Figure 17:
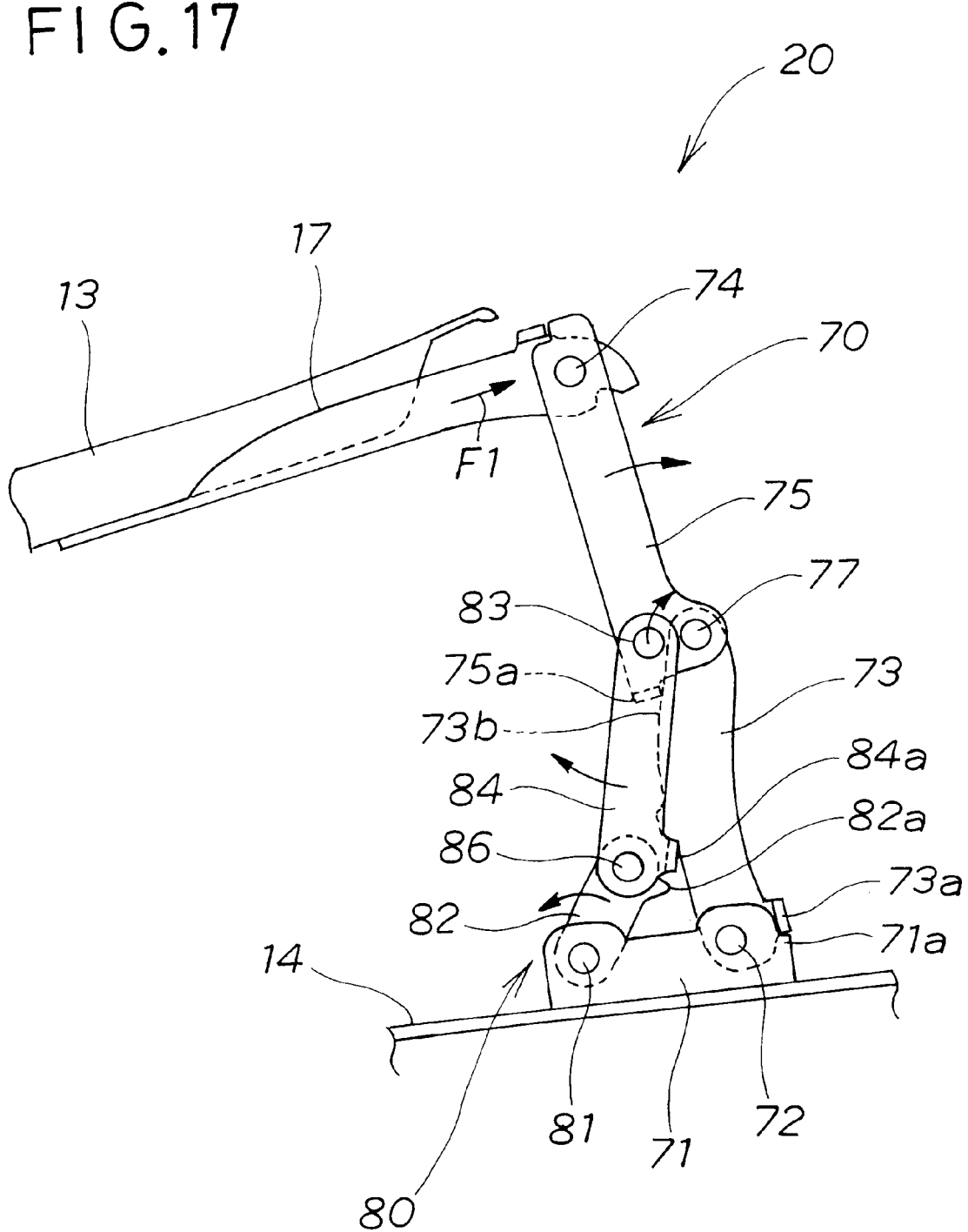
FIG. 17 is a view showing the operation of the hood holding mechanism which is in the state of holding the hood lifted up by a bendable link which is stretched.

Refering to FIG. 17, immediately before the hood 13 is deformed, a rearward shock F1 acts on the second pin 74 from the hood 13 via the swing arm 17. The upper link 75 is rotated about the third pin 77 in the clockwise direction by the shock F1. At this time, since the second auxiliary pin 83 mounted to the upper link 75 is displaced in the clockwise direction, the lower auxiliary link 82 and the upper auxiliary link 84 act to assume the stretched state. Specifically, the lower auxiliary link 82 rotates about the first auxiliary pin 81 in the counterclockwise direction, while the upper auxiliary link 84 rotates about the second auxiliary pin 83 in the clockwise direction.

Figure 18:
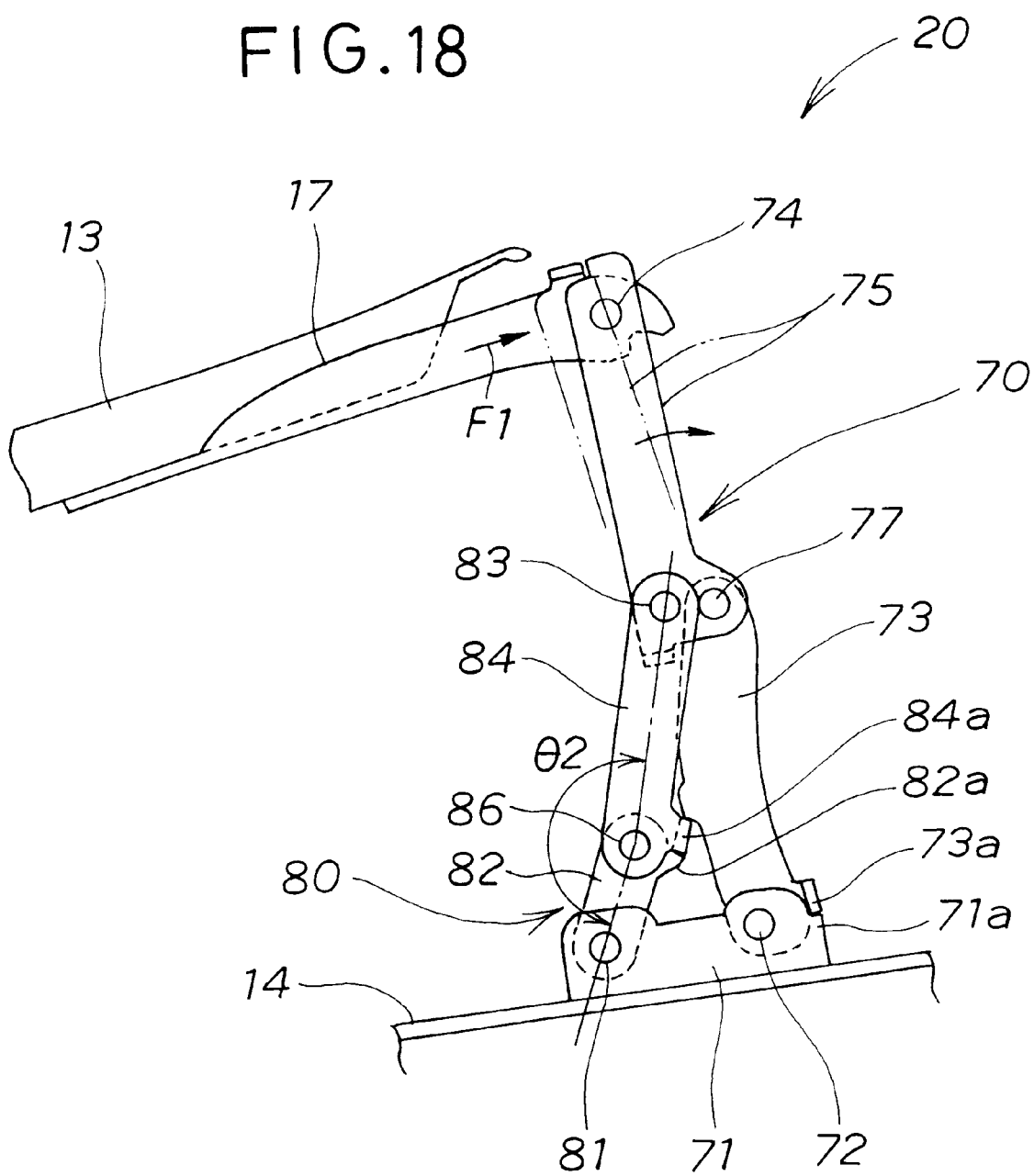
FIG. 18 is a view showing the operation of the hood holding mechanism when a force acts on the hood to a further extent toward the rear of the vehicle with respect to the state shown in FIG. 17.

If the auxiliary link mechanism 80 is to stretch, as shown in FIG. 18, the lower auxiliary link stopper 82a and the upper auxiliary link stopper 84a come into contact with each other, and the full opening degree (fully open angle) $\theta 2$ of the auxiliary link mechanism 80 is restricted. Accordingly, the upper link 75 cannot rotate about the third pin 77 toward the rear of the vehicle 11 beyond the position shown by solid lines.

The motions of the bendable link 70 and the auxiliary link mechanism 80 of the hood holding mechanism 20 will be described below with reference to FIGS. 19A to 23B.

Figure 19A:
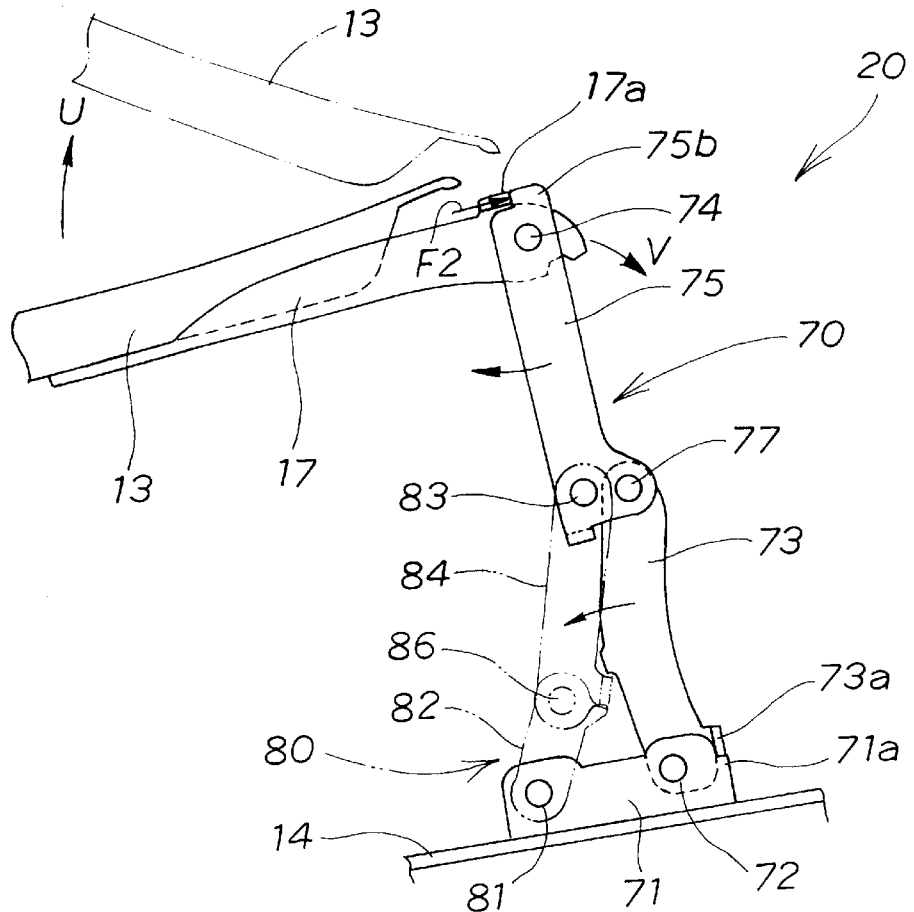
FIG. 19A to FIG. 24B are views showing the operations of the bendable link and an auxiliary link mechanism when the hood is being deformed from the state shown in FIG. 18.

As shown in FIG. 19A, the hood 13 is deformed and lifted upwardly as indicated by an arrow U, and at this time, the swing arm 17 rotates about the second pin 74 in the clockwise direction. This deformed state of the hood 13 is also shown in FIG. 16.

Figure 19B:
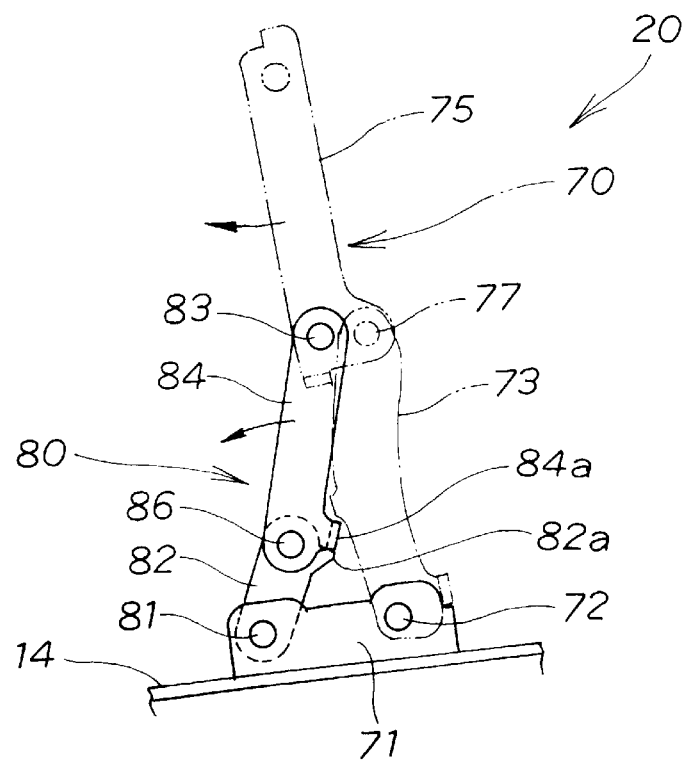

When the swing arm 17 rotates in the direction of the arrow U, the engagement portion 17a formed on the swing arm 17 comes into abutment with the stopper portion 75b formed on the upper link 75. At this time, a shock F2 acts on the stopper portion 75b from the hood 13 via the engagement portion 17a toward the rear of the vehicle 11. Owing to this shock F2, a clockwise moment about the second pin 74 occurs in the upper link 75, and the upper link 75 starts to rotate about the second pin 74 in the clockwise direction. The lower link 73 starts to swing about the first pin 72 in the counterclockwise direction. The rear end of the swing arm 17 starts to be displaced downwardly toward the rear as indicated by an arrow V. In this manner, when the upper link 75 starts to rotate about the second pin 74 in the clockwise direction, the upper auxiliary link 84 rotates about the third auxiliary pin 86 in the counterclockwise direction as shown in FIG. 19B.

Figure 20A:
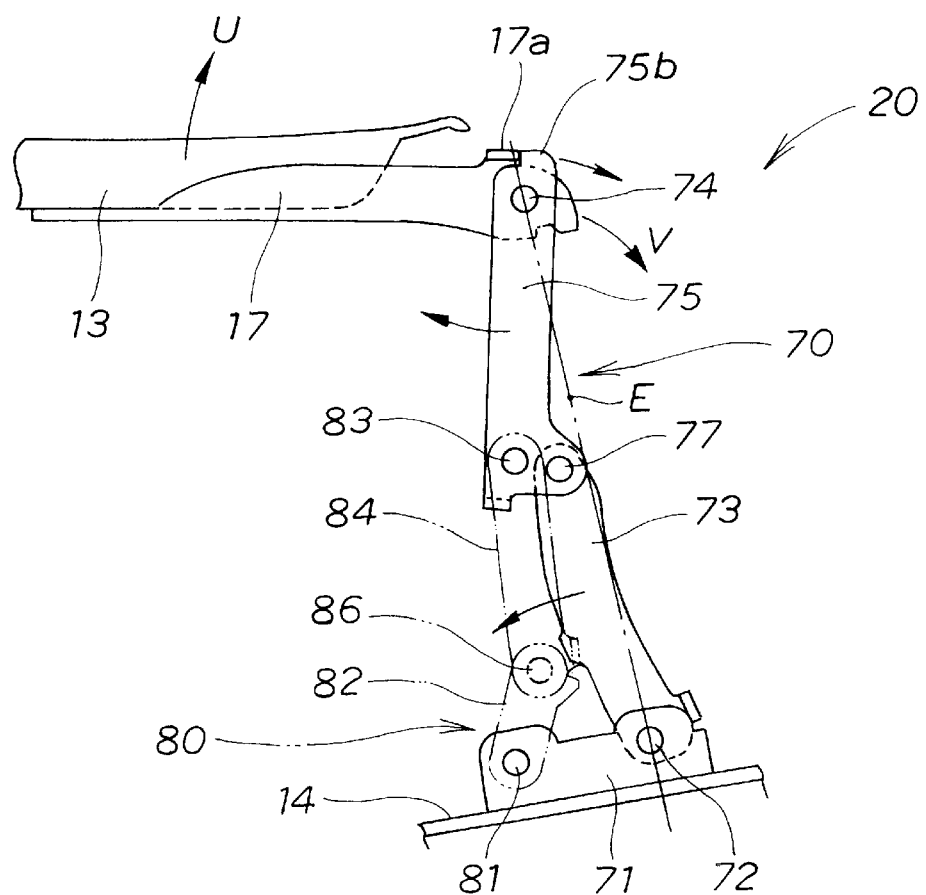
Figure 20B:
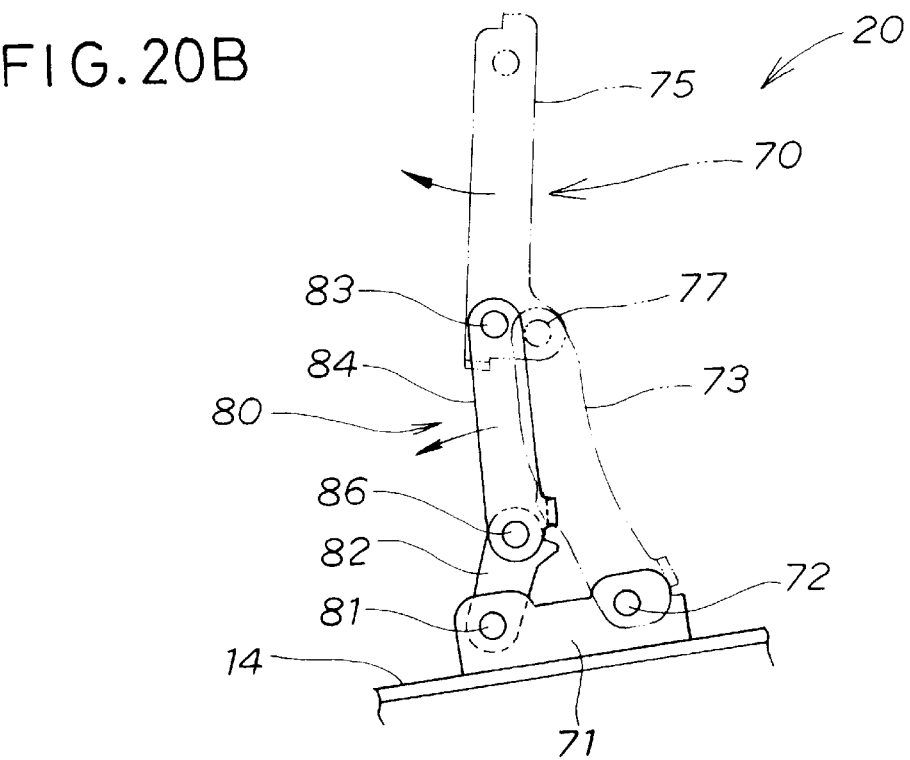

As shown in FIG. 20A, since the swing arm 17 rotates further in the direction of the arrow U, the upper link 75 continues to rotate about the second pin 74 in the clockwise direction, while the lower link 73 which is rotatably connected to the upper link 75 via the third pin 77 continues to rotate about the first pin 72 in the counterclockwise direction. Accordingly, the third pin 77 is offset from the straight line E toward the front of the vehicle 11. The rear end of the swing arm 17 is displaced further in the direction of the arrow V. In this manner, when the upper link 75 continues to rotate, as shown in FIG. 20B, the upper auxiliary link 84 which is connected to the other end of the upper link 75 via the second auxiliary pin 83 also continues to rotate about the first auxiliary pin 81 in the counterclockwise direction as shown by an arrow.

Figure 21A:
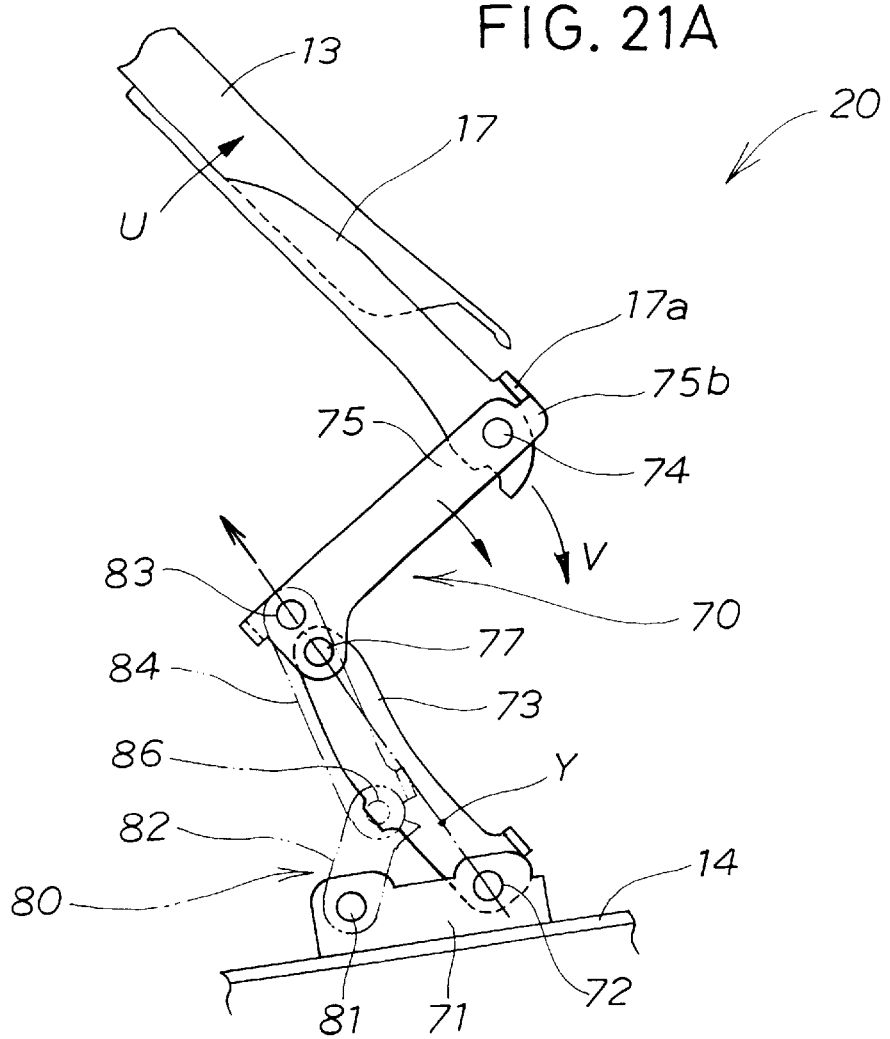

As the swing arm 17 swings yet further, the upper link 75 and lower link 73 rotate further, and as shown in FIG. 21A, the first pin 72, the third pin 77 and the second auxiliary pin 83 are arrayed along a straight line as shown by a straight line Y.

When the first pin 72, the third pin 77 and the second auxillary pin 83 are arrayed along the straight line in this manner, the clockwise rotating force of the upper link 75 about the second pin 74 acts on the lower link 73 as only a force which pulls the lower link 73 in the direction of the other end thereof along the straight line Y as indicated by an arrow. Accordingly, the counterclockwise rotation of the lower link 73 about the first pin 72 comes to a stop. Then, if the upper link 75 tries to rotate further in the clockwise direction, the axis of rotation of the upper link 75 transfers from the second pin 74 to the third pin 77, and the upper link 75 rotates about the third pin 77 in the clockwise direction.

Figure 21B:
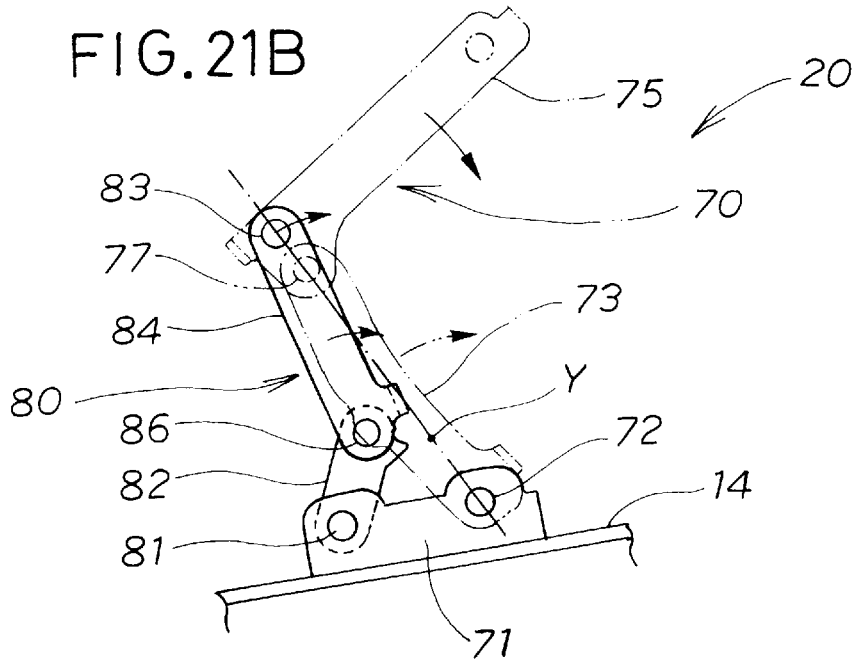

When the upper link 75 and the third pin 77 rotates about the third pin 77 in the clockwise direction, as shown in FIG. 21B, the second auxiliary pin 83 moves about the third pin 77 in the clockwise direction, while the upper auxiliary link 84 rotates about the third auxiliary pin 86 in the clockwise direction. With the rotation of the upper auxiliary link 84, the lower link 73 reverses about the first pin 72 in the clockwise direction.

Figure 22A:
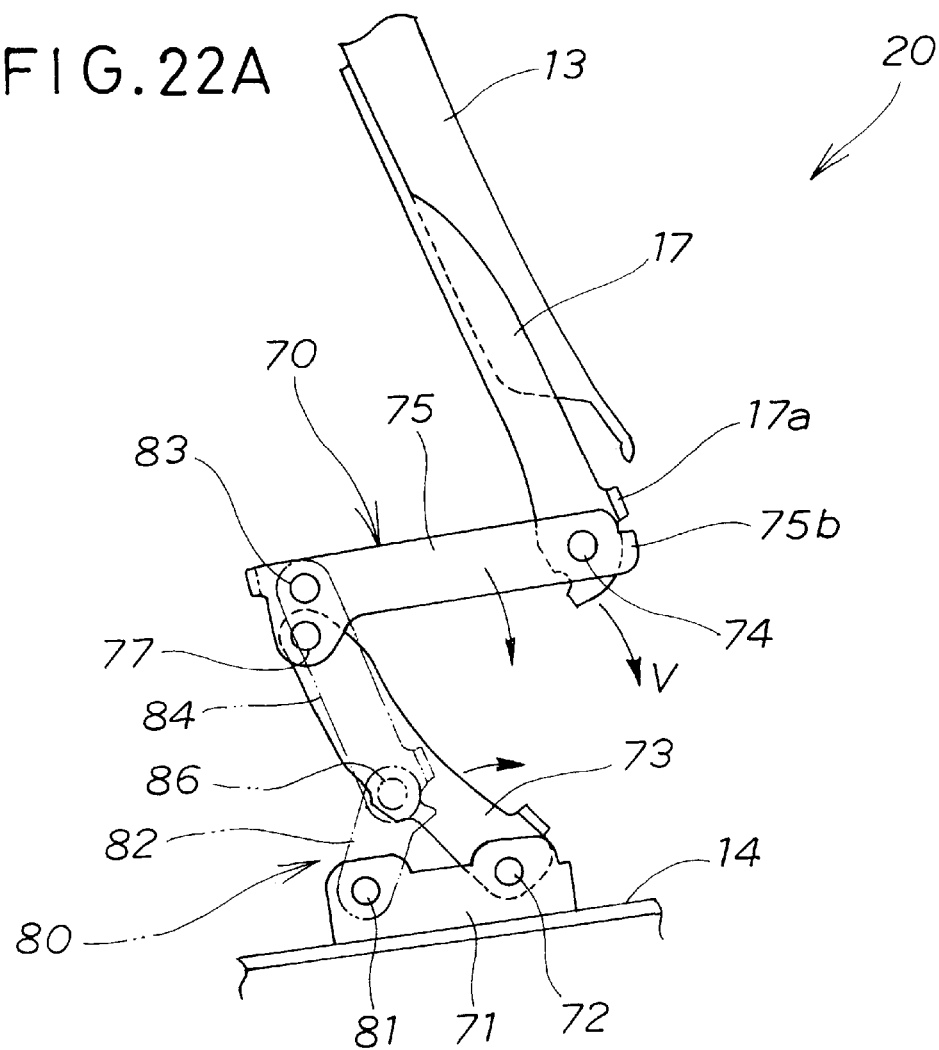
Figure 22B:
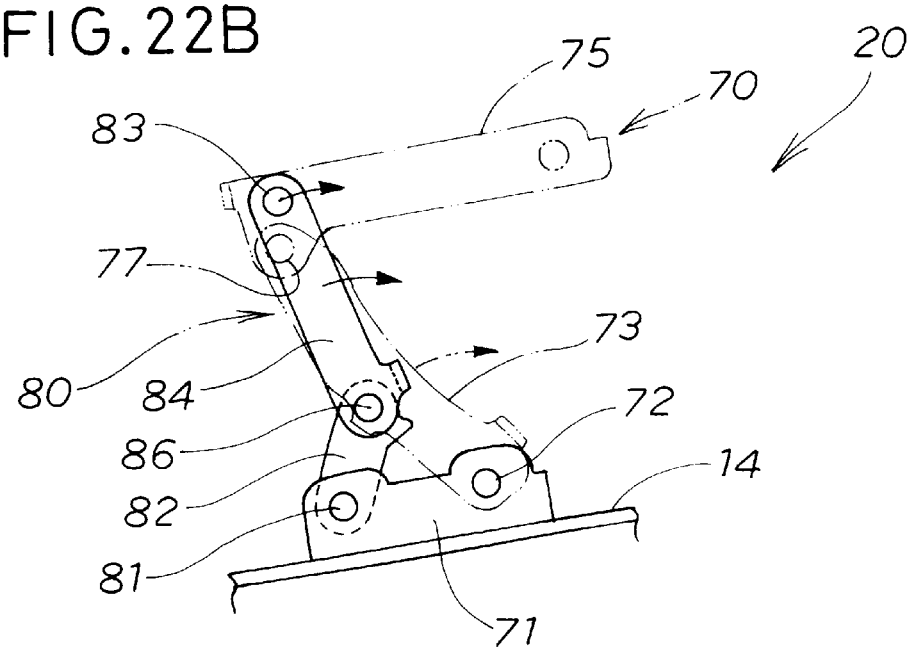

Referring to FIG. 22A, as the rotation of the upper link 75 proceeds, the lower link 73 rotates further about the first pin 72 in the clockwise direction. The rear end of the swing arm 17 is displaced further in the direction of the arrow V. In this manner, with the rotation of the upper link 75, as shown in FIG. 22B, the upper auxiliary link 84 rotates further about the third auxiliary pin 86 in the clockwise direction. Because the length of the upper auxiliary link 84 is smaller than that of the lower link 73, if the upper auxiliary link 84 rotates by a predetermined angle, the rotating angle of the lower link 73 is smaller than the predetermined rotating angle of the upper auxiliary link 84. Accordingly, the second auxiliary pin 83 moves beyond the third pin 77 toward the rear of the vehicle 11.

Figure 23A:
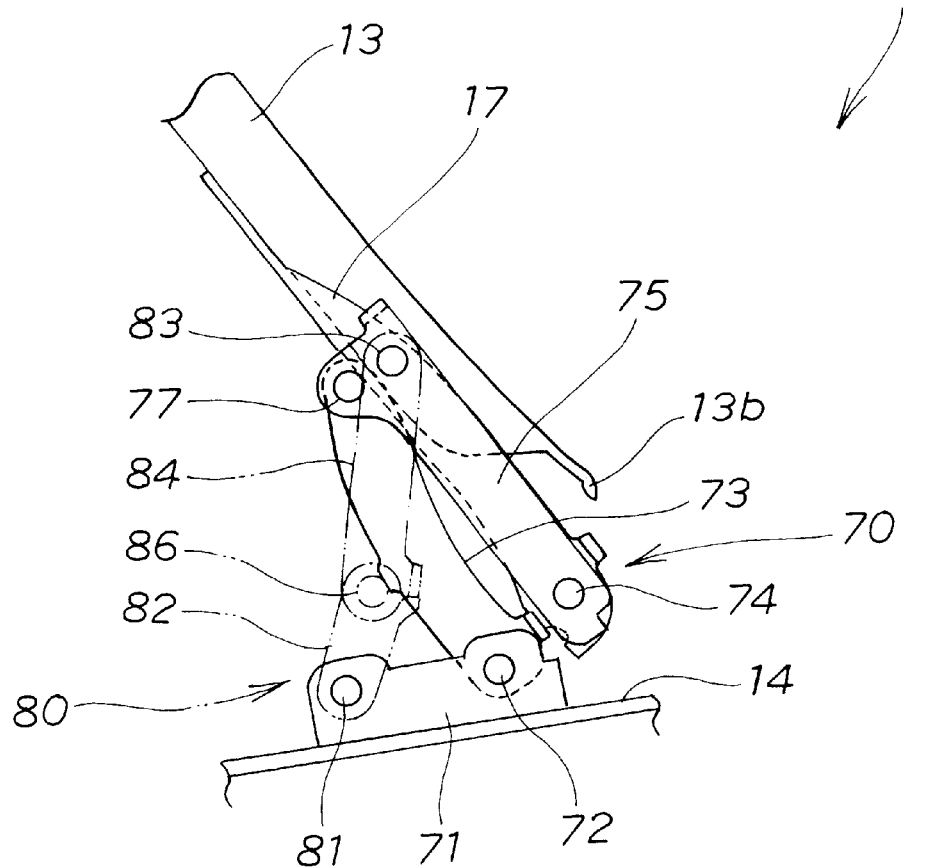
Figure 23B:
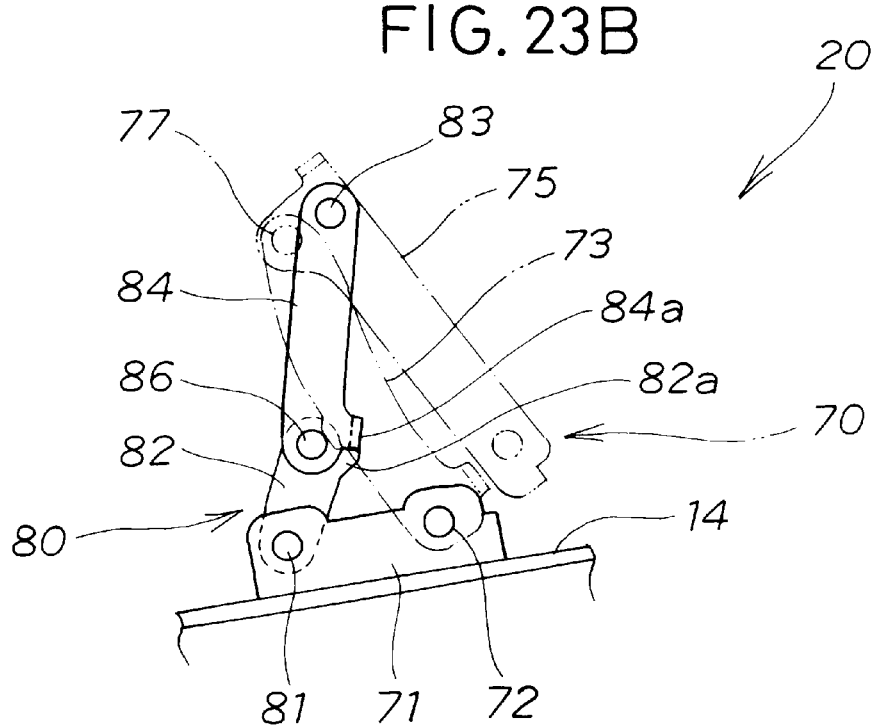

Referring to FIG. 23A, the upper link 75 and the lower link 73 are completely bent, and the rotation of each of the links 75 and 73 comes to a stop and the second auxiliary pin 83 moves beyond the third pin 77 toward the rear of the vehicle 11. Specifically, as shown in FIG. 23B, the lower auxiliary link stopper 82a comes into abutment with the upper auxiliary link stopper 84a, and the rotation of the upper auxiliary link 84 comes to a stop. At this time, since the position of the third pin 77 is determined, the upper link 75 and the lower link 73 stop at their maximum rotational positions.

Figure 24A:
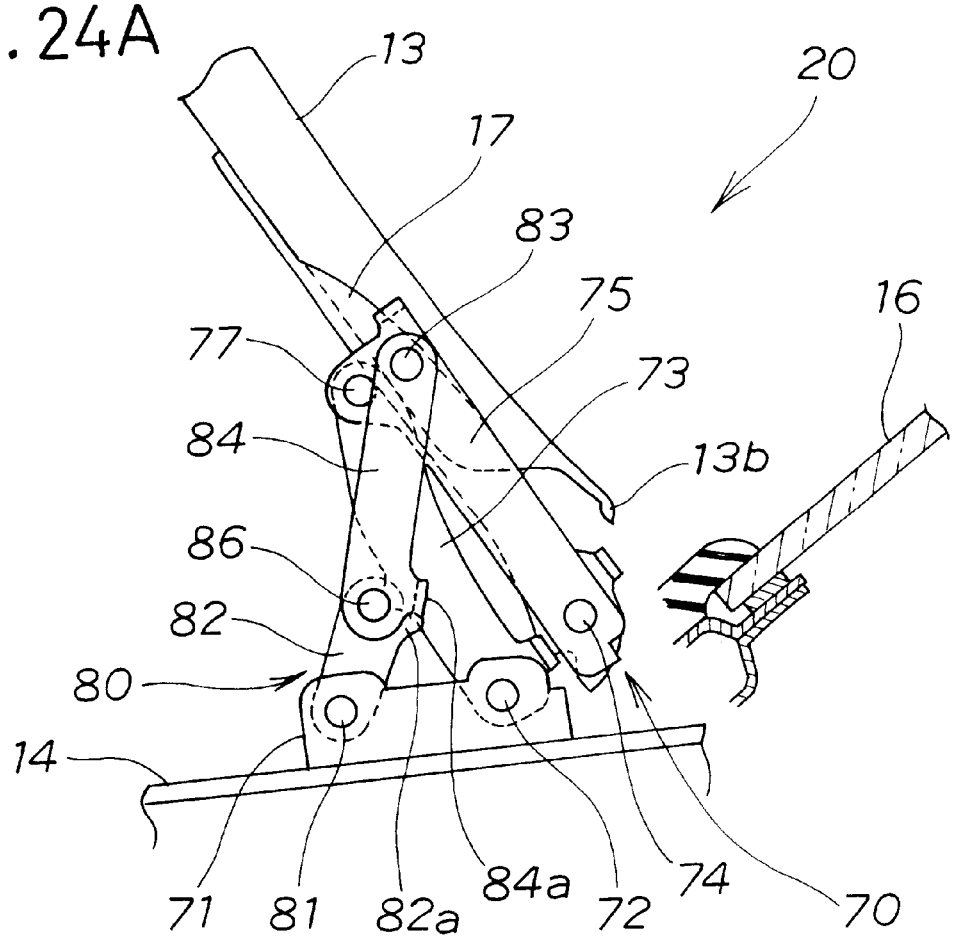
Figure 24B:
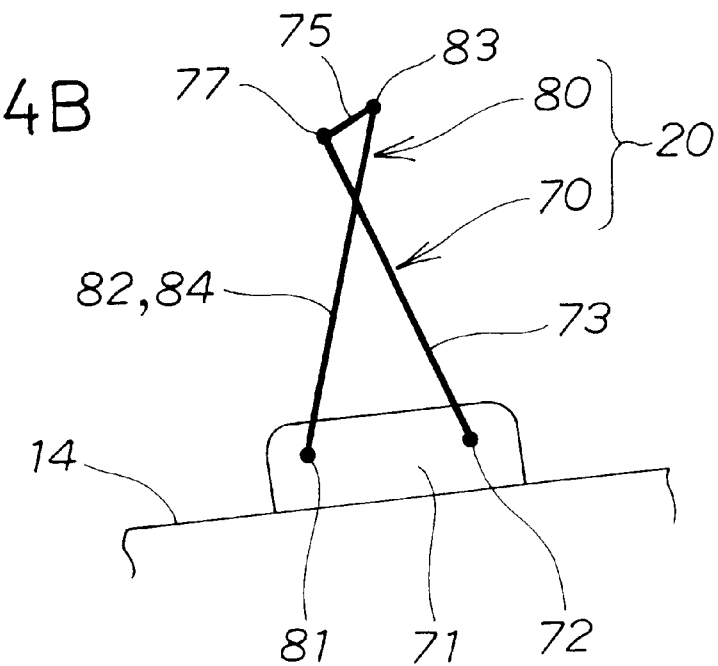

In this manner, since the upper auxiliary link 84 rotates no further toward the rear of the vehicle 11, the bendable link 70 and the auxiliary link mechanism 80 constitute a structure equivalent to a quadruple link as shown in FIG. 24B, and are placed in a state which is stable toward both the front and the rear. As shown in FIG. 24A, when the bendable link 70 stops at the maximum swing position, the position of a rear end 13b of the hood 13 is determined at a position which is spaced apart from the front surface of the windshield 16 by a predetermined distance toward the front of the vehicle 11. The rear end 13b of the hood 13 moves no further toward the rear of the vehicle 11. In this manner, since the movement of the bendable link 70 is restricted by the auxiliary link mechanism 80, the movement of the lifted-up hood 13 toward the rear of the vehicle 11 is restricted. Accordingly, the rear end 13b of the hood 13 is prevented from approaching the windshield 16 more closely than necessary.

Since the hood holding mechanism 20 is made of the bendable link 70 and the auxiliary link mechanism 80, the number of links included in the hood holding mechanism 20 is large. A shock due to collision can be dispersedly received by these numerous links. Accordingly, since an excessive shock does not act on part of the links or relevant components, the rigidity of each part can be decreased.

In the above-described embodiment, the hood holding mechanism 20 may be directly mounted to the hood 13, and the presence or absence of the swing arm 17 is arbitrary.

A restricting part which restricts the fully open angle α3 of the hood holding mechanism 20 is not limited to the lower stopper 73a and the upper stopper 75a.

Obviously, various minor changes and modifications of the resent invention are possible in the light of the above teaching. It is therefore to be understood that within the cope of the appended claims, the invention may be practiced otherwise than as specifically described.

What is claimed is:

1. A vehicle hood apparatus which, when a vehicle collides with an obstacle, lifts up by a predetermined amount a rear end portion of a hood provided at a front portion of the vehicle and causes a hood holding mechanism to hold the position of the lifted-up rear end portion and restricts a movement of the lifted-up rear end portion toward the rear of the vehicle, the hood holding mechanism including a bendable link which bends or stretches according to an up or down movement of the hood, and an auxiliary link which restricts movement of the bendable link toward the rear of the vehicle;

the bendable link including a lower link rotatably secured at one end to a bracket mounted to a body of the vehicle, an upper link rotatably secured at one end to the hood, and a hinge portion which rotatably connects the other end of the lower link and that of the upper link to each other;

the auxiliary link mechanism including two links which are connected between a position offset from and close to the hinge portion and a front portion of the bracket, the two links being connected to each other so that they bend or stretch according to bending or stretching of the bendable link.

2. A vehicle hood apparatus according to claim 1, wherein the auxiliary link mechanism includes a lower auxiliary link rotatable secured at one end to the front portion of the bracket, an upper auxiliary link rotatable secured at one end to a position offset from the hinge portion, and an auxiliary hinge portion which rotatably connects the other end of the lower auxiliary link and that of the upper auxiliary link to each other.

3. A vehicle hood apparatus according to claim 2, wherein the other end of the lower auxiliary link and that of the upper auxiliary link respectively have stoppers which engage with or disengage from each other when both links bend or stretch.

* * * * *